(12) United States Patent
Awatsuji et al.

(10) Patent No.: US 8,654,343 B2
(45) Date of Patent: Feb. 18, 2014

(54) INTERFERENCE MEASUREMENT APPARATUS AND METHOD FOR MEASURING INTERFERENCE

(75) Inventors: Yasuhiro Awatsuji, Kyoto (JP); Tatsuki Tahara, Kyoto (JP)

(73) Assignee: National University Corporation Kyoto Institute of Technology, Kyoto (JP)

( * ) Notice: Subject to any disclaimer, the term of this patent is extended or adjusted under 35 U.S.C. 154(b) by 136 days.

(21) Appl. No.: 13/138,408

(22) PCT Filed: Jan. 13, 2010

(86) PCT No.: PCT/JP2010/000132
§ 371 (c)(1),
(2), (4) Date: Aug. 11, 2011

(87) PCT Pub. No.: WO2010/092739
PCT Pub. Date: Aug. 19, 2010

(65) Prior Publication Data
US 2011/0292402 A1 Dec. 1, 2011

(30) Foreign Application Priority Data
Feb. 13, 2009 (JP) .................................. 2009-031449

(51) Int. Cl.
*G01B 9/02* (2006.01)
(52) U.S. Cl.
USPC .......................................... 356/495; 356/503
(58) Field of Classification Search
USPC ................. 356/495, 511, 489, 496, 487, 491, 356/492–494, 516, 365, 9, 10, 28, 30
See application file for complete search history.

(56) References Cited

U.S. PATENT DOCUMENTS 4,872,755 A * 10/1989 Kuchel ........................... 356/495
5,321,497 A * 6/1994 Ai et al. ......................... 356/514

(Continued)

FOREIGN PATENT DOCUMENTS

JP 2002-526815 A 8/2002
JP 2004-138617 5/2004

(Continued)

OTHER PUBLICATIONS

Ichirou Yamaguchi, et al., "Surface contouring by . . . ", Optics and Lasers in Engineering. 2001. vol. 36, pp. 417-428.

(Continued)

*Primary Examiner* — Gregory J Toatley
*Assistant Examiner* — Maurice Smith
(74) *Attorney, Agent, or Firm* — Harness, Dickey & Pierce P.L.C.

(57) ABSTRACT

An embodiment of the present invention realizes an interference measurement apparatus which can obtain an interference image to be used for obtaining three-dimensional information of a subject which dynamically changes. An interference measurement apparatus of the present invention, which captures an interference image formed by the reference light beam and the object light beam which has reached the image-capturing element via a subject, the interference measurement apparatus includes: a laser light source; a beam splitter which splits a laser beam into a reference light beam and an object light beam; and an image-capturing element; a polarization splitting section which splits the object light beam into two types of object light beams which are different in polarization direction so that an angular difference is caused between respective propagation directions of the two types of object light beams; and a polarizer array device which allows (i) the reference light beam and (ii) the two types of object light beams which have reached the polarizer array device via the subject to pass through the polarizer array device (30), the polarizer array device in which a plurality of first polarizer regions and a plurality of second polarizer regions are arranged, and each of the plurality of first polarizer regions and each of the plurality of second polarizer regions respectively allowing light components which are different in polarization direction. This makes it possible to obtain, by one-time image capturing, a plurality of interference patterns required for phase unwrapping.

8 Claims, 23 Drawing Sheets

(56) References Cited

U.S. PATENT DOCUMENTS

| | | | |
|---|---|---|---|
| H001370 H * | 11/1994 | Wolch et al. | 356/491 |
| 6,262,818 B1 | 7/2001 | Cuche et al. | |
| 6,421,131 B1 * | 7/2002 | Miller | 356/453 |
| 6,519,040 B1 * | 2/2003 | Amos | 356/453 |
| 6,847,457 B2 * | 1/2005 | Tobiason et al. | 356/495 |
| 6,961,123 B1 * | 11/2005 | Wang et al. | 356/364 |
| 7,265,834 B2 | 9/2007 | Kawakami et al. | |
| 2003/0035113 A1 * | 2/2003 | Wang et al. | 356/491 |
| 2004/0070767 A1 | 4/2004 | Tobiason et al. | |
| 2004/0080754 A1 | 4/2004 | Tobiason et al. | |
| 2009/0065478 A1 * | 3/2009 | Dockery et al. | 216/60 |
| 2010/0253986 A1 * | 10/2010 | Awatsuji et al. | 359/10 |

FOREIGN PATENT DOCUMENTS

| | | | |
|---|---|---|---|
| JP | 2005-283683 A | 10/2005 | |
| WO | WO-0020929 A1 | 4/2000 | |

OTHER PUBLICATIONS

Yan Zhang, et al., "Reconstruction of in-line . . . ", Optics Letters, Aug. 1, 2004, vol. 29, No. 15, pp. 1787-1789.

Daniel Parshall, et al., "Digital holographic Microscopy . . . ", Applied Optics, Jan. 20, 2006, vol. 45, No. 3, pp. 451-459.

X. F. Meng, et al., "Two-step phase-shifting . . . ", Optics Letters, May 15, 2006, vol. 31, No. 10, pp. 1414-1416.

Yasuhiro Awatsuji et al., "Single-shot phase-shifting . . . ", 2007 IEEE LEOS Annual Meeting (LEOS 2007) Conference Proceedings, 2007. 10, pp. 84-85.

International Search Report from International Application mailed Apr. 20, 2010.

Japanese Office Action date Oct. 1, 2013 for corresponding Japanese Application No. 2010-550426 (with translation).

* cited by examiner

FIG. 7
(a)
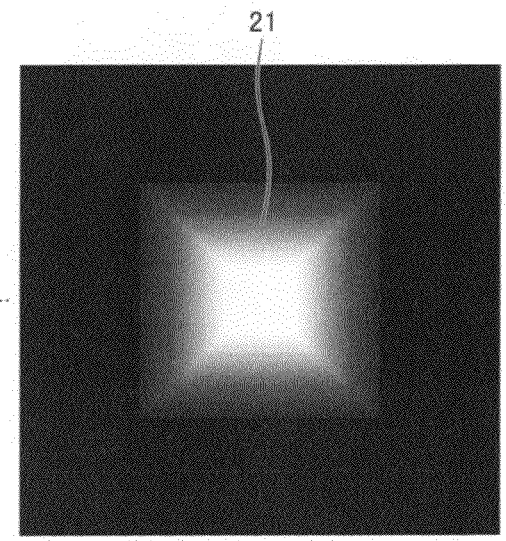
(b)
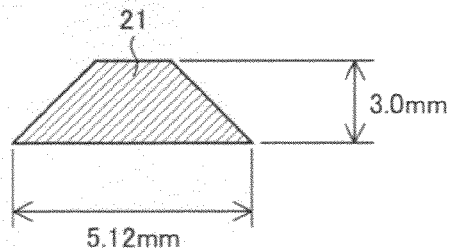
(c)
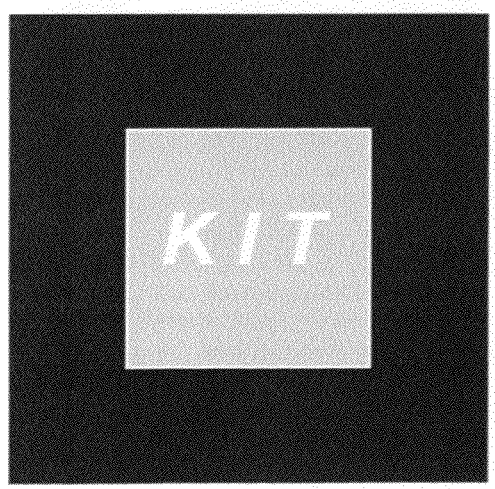

INTERFERENCE MEASUREMENT APPARATUS AND METHOD FOR MEASURING INTERFERENCE

TECHNICAL FIELD

The present invention relates to (i) an interference measurement apparatus which measures an interference image formed by interference between a reference light beam and an object light beam so as to measure a shape of a subject, and to (ii) a method for measuring interference.

BACKGROUND ART

Hereinafter, phases are expressed in radians. With increase of accuracy and variety of processing techniques, advanced measurement and analysis of a three-dimensional shape etc. of an object are sought after. Accordingly, various measurement methods have been developed. Among such measurement method, interference measurement techniques utilizing light interference, especially, digital holography makes it possible to obtain three-dimensional information of an object in a non-contact and non-destructive manner. Accordingly, digital holography is one of measurement methods which receive attention recently.

Digital holography is a technique for reproducing an image of a three-dimensional object by use of a computer on the basis of an interference pattern (interference fringe) which is obtained by light irradiation to the three-dimensional object. Specifically, for example, an image-capturing element such as a CCD (charge coupled device) is used to record an interference pattern formed by (i) an object light beam obtained by light irradiation to a three-dimensional object and (ii) a reference light beam which is coherent to the object light beam. On the basis of the interference pattern thus recorded, a computer carries out Fresnel transformation so as to reproduce an image of the three-dimensional object.

FIG. 26 is a schematic view illustrating an arrangement of a conventional digital holography apparatus (Non-patent Literature 1). A digital holography apparatus 120 has an optical system which includes a laser light source 101, a CCD camera 102, and a computer 110. A laser beam emitted from the laser light source 101 passes through a beam expander 103 and a collimator lens 104 so as to be a collimated laser beam. Then, the collimated laser beam is split by a beam splitter 105 into a reference light beam and an object light beam. The object light beam is reflected by a movable mirror 106 so as to be directed to a subject 111. Then, the object light beam is reflected by the subject 111 so as to reach an image-capturing plane of the CCD camera 102 via a half mirror 107. On the other hand, the reference light beam is reflected by a mirror 108, a PZT mirror 109, and the half mirror 107 so as to reach the image-capturing plane of the CCD camera 102. The CCD camera 102 records an interference pattern formed by the object light beam and the reference light beam which have reached the image-capturing plane. The computer 110 carries out calculation such as Fresnel transformation with respect to the interference pattern thus recorded, thereby obtaining a reconstructed image of the subject 111.

The subject 111 has a height h(x) along its depth direction from a position x (i.e., direction perpendicular to the image-capturing plane of the CCD camera 102).

In the digital holography apparatus 120, the reference light beam is incident upon the image-capturing plane of the CCD camera 102 almost perpendicularly. That is, the reference light beam and the object light beam are incident upon the image-capturing plane of the CCD camera 102 from substantially the same direction. It follows that a reconstructed image which is obtained by carrying out Fresnel transformation with respect to an interference pattern is made up of a zeroth-order diffraction image and a ±first-order diffraction image which are superimposed on each other. This makes it difficult to obtain a clear reconstructed image of the subject 111.

In view of this, there proposed a technique called phase-shifting technique (see Patent Literature 1 and Non-patent Literature 1). According to the phase-shifting technique, in order that a zeroth-order diffraction image and a ±first-order diffraction image are separated so that a high-accuracy reconstructed image is obtained, a phase of a reference light beam is shifted to a plurality of steps so as to obtain a plurality of interference patterns, and a desired reconstructed image is obtained from the plurality of interference patterns. Further, there proposed such a technique that a desired reconstructed image is obtained by use of a plurality of interference patterns among which a distance between a subject and an image-capturing element differs (Non-patent Literature 2). Hereinafter, the technique is referred to as optical path length-shifting technique.

The digital holography apparatus 120 carries out microscopic displacement of the PZT mirror 109 by use of a piezoelectric element so as to shift a phase of a reference light beam to three or four steps, and sequentially records respective interference patterns. Then, the digital holography apparatus 120 carries out calculation on the basis of a plurality of interference patterns thus recorded. Thus, the digital holography apparatus 120 can separately obtain a zeroth-order diffraction image and a ±first-order diffraction image.

At this stage, information indicative a position of the subject 111 along the depth direction which information is obtained on the basis of a phase distribution is folded into a wavelength range of the laser beam. In order to dissolve such folding so as to obtain information indicative of a position of the subject 111 along the depth direction which information originally goes beyond the wavelength range, it is necessary to carry out phase unwrapping. In a case where phase unwrapping is carried out by calculation based on positional information obtained from one interference pattern, a steep unevenness or the like of the subject 111 hinders correct phase unwrapping. As a result, obtained positional information is less-accurate one containing many errors. Accordingly, in order to obtain high-accuracy positional information, it is necessary to carry out phase unwrapping by the following optical technique.

The digital holography apparatus 120 changes an angle of the movable mirror 106 by $\Delta\theta/2$ so as to record interference patterns between which an angle of a propagation direction of the object light beam incident upon the subject 111 is changed by $\Delta\theta$. The use of such two interference patterns between which the angle of the propagation direction of the object light beam incident upon the subject 111 is changed by $\Delta\theta$ makes it possible to carry out correct phase unwrapping (Non-patent Literature 1).

Another optical technique is phase unwrapping utilizing two types of laser beams which differ in wavelength (Non-patent Literature 3). According to the technique, it is possible to freely change a synthetic wavelength, depending on how two wavelengths are combined. Further, it is possible to obtain a phase distribution equivalent to one which is obtained by use of a very long synthetic wavelength, as compared to a case of one wavelength. Accordingly, a phase folding is small. Further, increasing the number of wavelengths to be used makes it possible to expand a range of depth directions in which range phase unwrapping can be carried out.

CITATION LIST

Patent Literature 1

Japanese Patent Application Publication, Tokukai, No. 2005-283683 A (Publication Date: Oct. 13, 2005)

Non-Patent Literature 1

Ichirou Yamaguchi, et. al., *Surface contouring by phase-shifting digital holography*, Optics and Lasers in Engineering, 2001, Vol. 36, pp. 417-428

Non-Patent Literature 2

Yan Zhang, et. al., *Reconstruction of in-line digital holograms from two intensity measurements*, Optics Letters, 2004, Vol. 29, No. 15, pp. 1787-1789

Non-Patent Literature 3

Daniel Parshall, et. al., *Digital holographic microscopy with dual-wavelength phase unwrapping*, APPLIED OPTICS, 20 Jan. 2006, Vol. 45, No. 3, pp. 451-459

Non-Patent Literature 4

M. F. Meng, et. al., *Two-step phase-shifting interferometry and its application in image encryption*, OPTICS LETTERS, 15 May 2006, Vol. 31, No. 10, pp. 1414-1416

SUMMARY OF INVENTION

Technical Problem

However, phase unwrapping according to the optical techniques bears a problem in that at least two interference patterns are required in any case. Accordingly, an image of a subject must be captured more than once, and meanwhile, the subject must stand still. In addition, there is a large effect of shaking of the subject and the optical system.

According to the arrangement of FIG. 16, the movable mirror 106 is rotated so that an angle of the propagation direction of the object light beam is changed, thereby sequentially recording the interference patterns. Accordingly, a time is required for obtaining a plurality of interference patterns. Therefore, it is impossible to obtain a three-dimensional shape of a subject which dynamically changes or moves. In addition, it is impossible to obtain a three-dimensional shape of the subject of a certain moment.

A phase unwrapping technique utilizing laser beams having respective different wavelengths, which is used in Non-patent Literature 3, is not applicable to a subject whose reflectance, transmittance, and/or refractive index has a large wavelength dependency. For example, it is impossible to obtain optical information from a subject which absorbs light having a specific wavelength, by use of light having the wavelength. Those two light beams having respective different wavelengths which can be used in measurement of such a subject have a limitation in that both two light beams have to be reflected, allowed to pass through, or diffracted so as to have an energy sufficient for recording of an interference image. Also in a case where an optical element such as a lens in an optical system has a wavelength dependency, accuracy of a result of phase unwrapping is low. Further, two different laser light sources are required for obtaining appropriate two interference patterns. This increases a size and a cost of an apparatus. Further, in a case where light axes of two laser beams are displaced, measurement accuracy and reliability become low. Therefore, it is necessary to accurately align the optical axes.

The present invention was made in view of the problems. An object of the present invention is to realize an interference measurement apparatus which can obtain, by one-time image capturing, interference images to be used for obtaining three-dimensional information of a subject. The three-dimensional information encompasses information on a three-dimensional shape, a position, and/or a distribution of the subject.

Solution to Problem

In order to attain the object, an interference measurement apparatus of the present invention includes: at least one light source which generates coherent light; a light splitting section which splits, into a reference light beam and an object light beam, the coherent light emitted from the at least one light source; an image-capturing section which captures an interference image formed by the reference light beam and the object light beam which has reached the image-capturing section via a subject; a polarization splitting section which splits, into two types of object light beams which are different in polarization direction, the object light beam emitted from the light splitting section, so that an angular difference is caused between respective propagation directions of the two types of object light beams; and a polarizer array section which allows (i) the reference light beam and (ii) the two types of object light beams which have reached the polarizer array section via the subject to pass through the polarizer array section, the polarizer array section in which a plurality of first polarizer regions and a plurality of second polarizer regions are arranged, and each of the plurality of first polarizer regions and each of the plurality of second polarizer regions respectively allowing light components which are different in polarization direction to pass through.

According to the arrangement, the object light beam can be split, by the polarization splitting section, into two types of object light beams which are different in polarization direction and whose propagation directions have an angular difference therebetween. Further, the polarizer array section allows the image-capturing section to separately capture the reference light beam and the object light beam according to a polarization direction.

This makes it possible to obtain, by one-time image capturing, interference images containing two types of interference information obtained by use of the two types of object light beams which have the angular difference therebetween. This makes it possible to carry out phase unwrapping on the basis of the interference images.

Therefore, even if a subject is, e.g., one which dynamically changes, it is possible to obtain the three-dimensional information of the subject of a certain moment by one-time image capturing.

Further, in order to attain the object, an interference measurement method of the present invention includes the steps of: splitting coherent light into a reference light beam and an object light beam; splitting the object light beam into two types of object light beams which are different in polarization direction, so that an angular difference is caused between respective propagation directions of the two types of object light beams; passing, through a polarizer array section in which a plurality of first polarizer regions and a plurality of second polarizer regions are arranged, the reference light beam and the two types of object light beams which have reached the polarizer array section via a subject, so that light components which are different in polarization direction pass through the plurality of first polarizer regions and the plurality of second polarizer regions; and capturing, an interference image formed by the reference light beam and the two types of object light beams which reference light beam and two types of object light beams have passed thorough the polarizer array section.

Advantageous Effects Of Invention

An interference measurement apparatus of the present invention includes: at least one light source which generates coherent light; a light splitting section which splits, into a reference light beam and an object light beam, the coherent light emitted from the at least one light source; an image-capturing section which captures an interference image formed by the reference light beam and the object light beam which has reached the image-capturing section via a subject; a polarization splitting section which splits, into two types of object light beams which are different in polarization direction, the object light beam emitted from the light splitting section, so that an angular difference is caused between respective propagation directions of the two types of object light beams; and a polarizer array section which allows (i) the reference light beam and (ii) the two types of object light beams which have reached the polarizer array section via the subject to pass through the polarizer array section, the polarizer array section in which a plurality of first polarizer regions and a plurality of second polarizer regions are arranged, and each of the plurality of first polarizer regions and each of the plurality of second polarizer regions respectively allowing light components which are different in polarization direction.

This makes it possible t obtain, by one-time image capturing, interference images containing two types of interference information obtained by use of the two types of object light beams which have the angular difference therebetween. This makes it possible to carry out phase unwrapping on the basis of the interference images.

This makes it possible to obtain three-dimensional information of a subject by one-time image capturing.

BRIEF DESCRIPTION OF DRAWINGS

FIG. 1 is a schematic view illustrating an arrangement of a digital holography apparatus of one embodiment of the present invention.

FIG. 2 is a schematic view illustrating a part of a polarizer array device provided in the digital holography apparatus.

FIG. 3 is a view for explaining an image reconstruction algorithm of the digital holography apparatus.

FIG. 4 is a schematic view illustrating an arrangement of a digital holography apparatus of another embodiment of the present invention.

Figure 5:
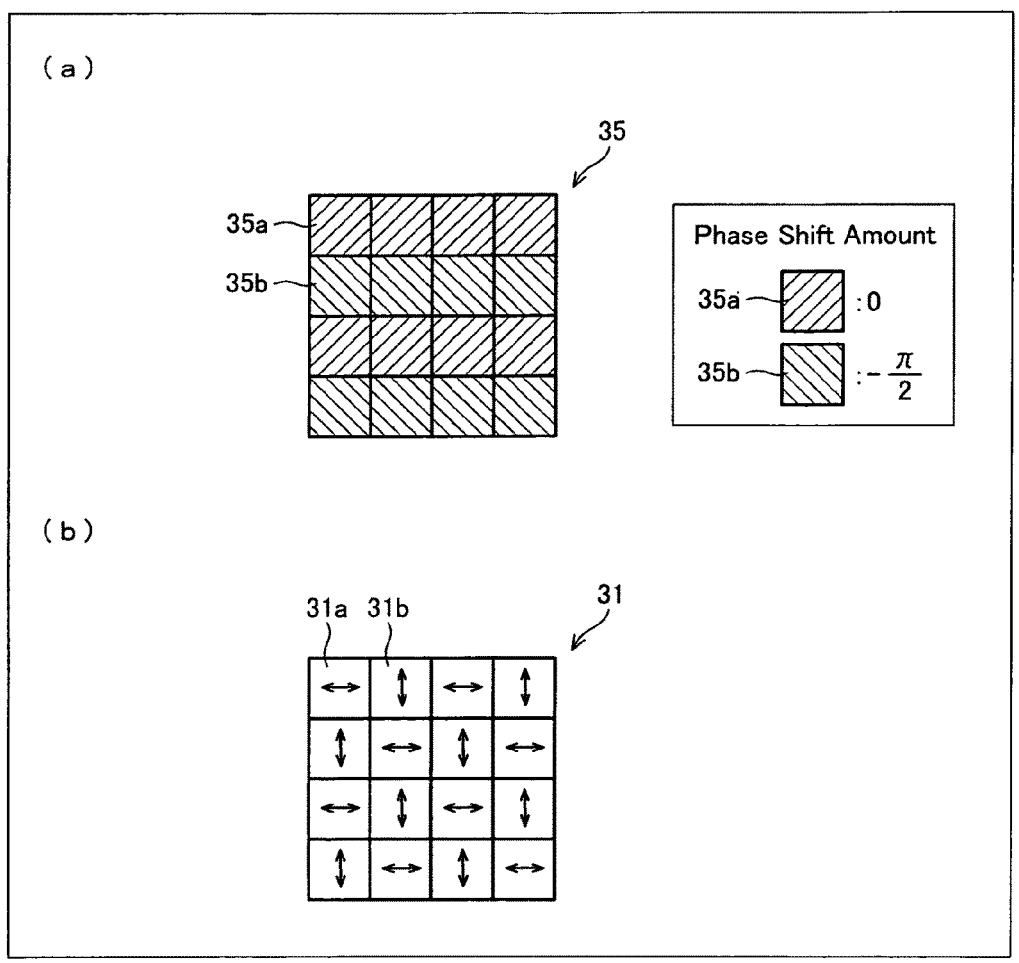
FIG. 5

(a) of FIG. 5 is a schematic view illustrating a part of a phase-shifting array device provided in the digital holography apparatus. (b) of FIG. 5 is a schematic view illustrating a part of a polarizer array device provided in the digital holography apparatus.

FIG. 6

Figure 6:
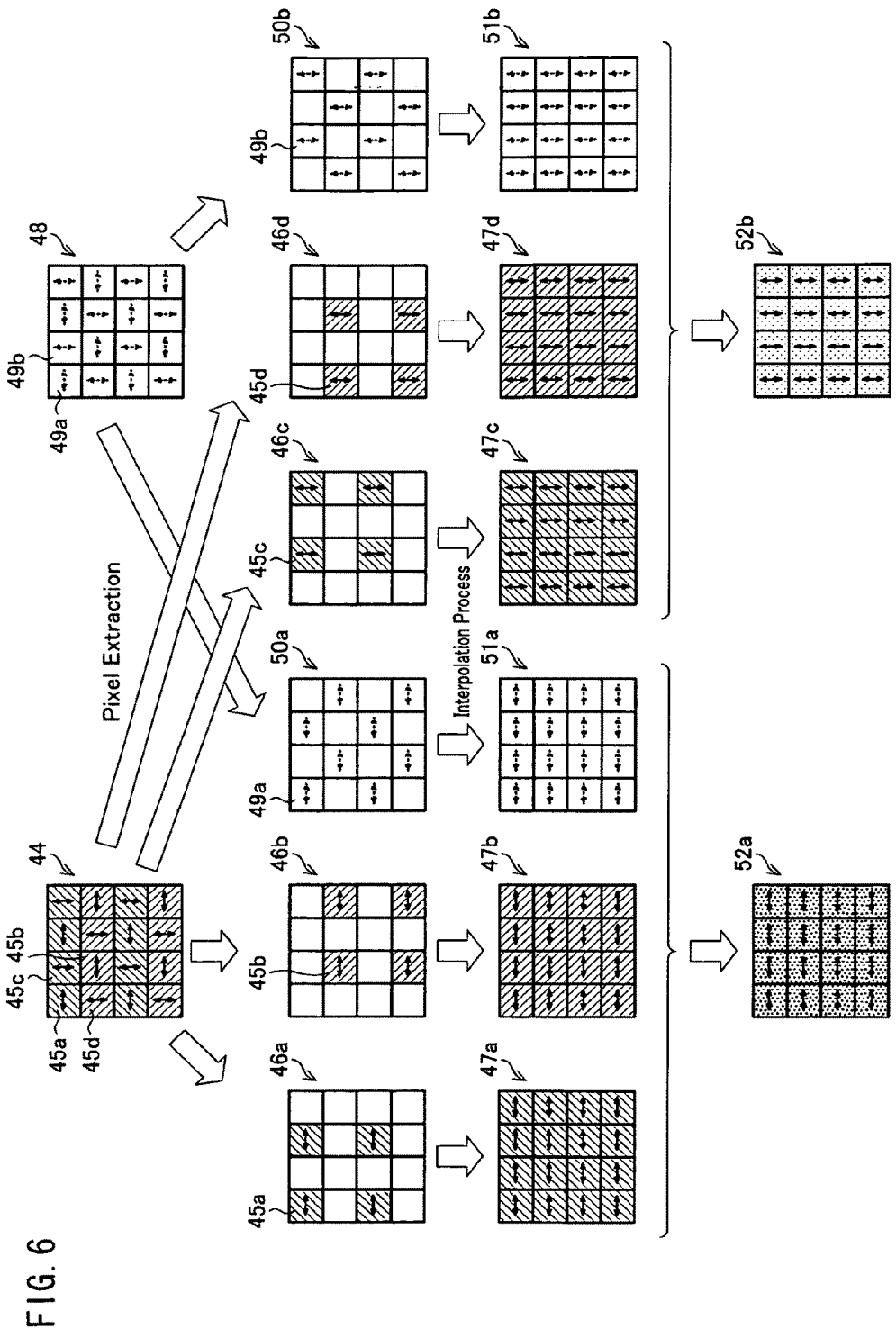

FIG. 6 is a view for explaining an image reconstruction algorithm of the digital holography apparatus.

FIG. 7

(a) of FIG. 7 is a view illustrating a height distribution of a subject. (b) of FIG. 7 is a cross-sectional view of the subject along a section line A in (a) of FIG. 7. (c) of FIG. 7 is a view illustrating an amplitude distribution which visually indicates a bright area and a dark area.

FIG. 8

Figure 8:
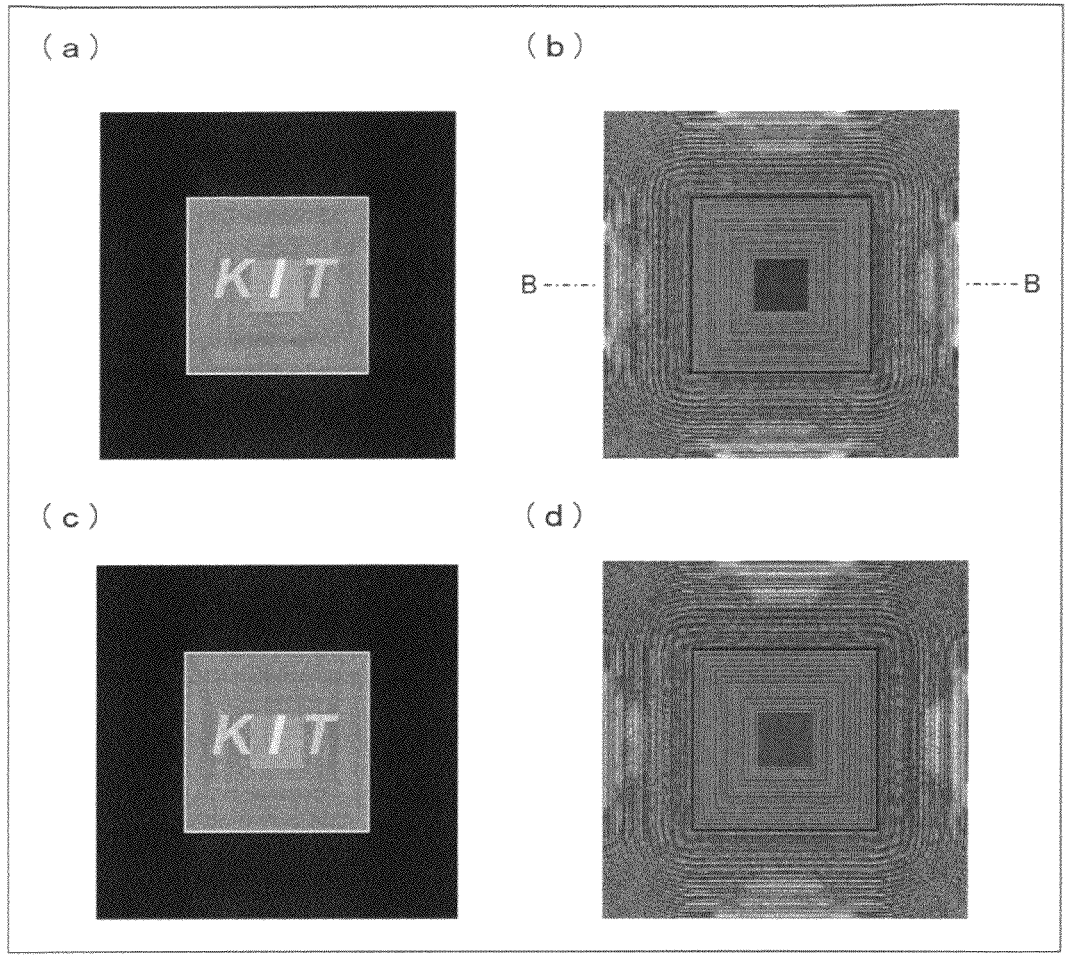

(a) of FIG. 8 is a view illustrating that reconstructed image (amplitude distribution) of the subject which was obtained by use of a horizontally-polarized object light beam. (b) of FIG. 8 is a view illustrating a phase distribution corresponding to (a) of FIG. 8. (c) of FIG. 8 is a view illustrating that reconstructed image (amplitude distribution) of the subject which was obtained by use of a vertically-polarized object light beam. (d) of FIG. 8 is a view illustrating a phase distribution corresponding to (c) of FIG. 8.

FIG. 9

Figure 9:
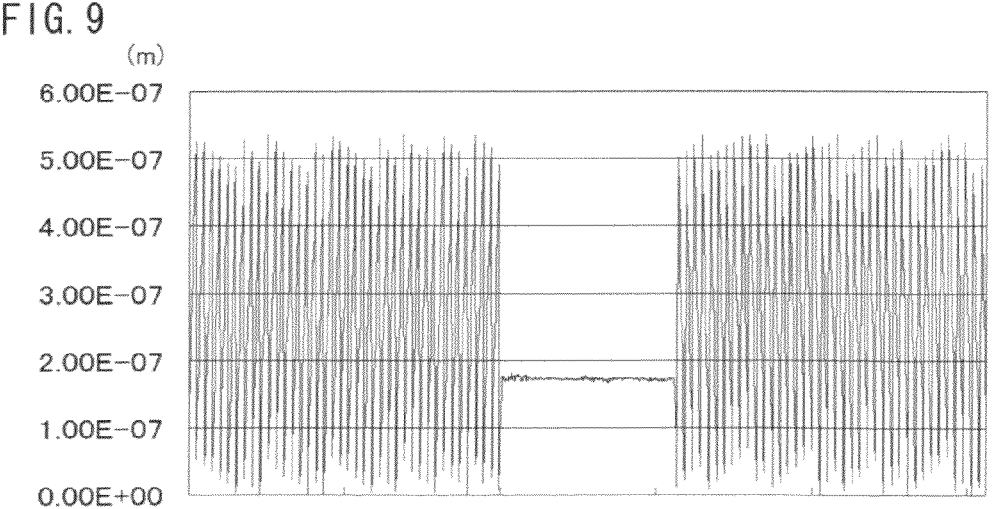

FIG. 9 is a view illustrating that phase distribution of the subject which was taken along a straight line B in (b) of FIG. 8 before phase unwrapping was carried out.

FIG. 10

Figure 10:
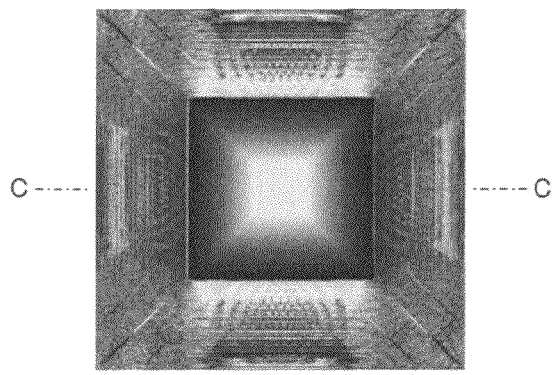

FIG. 10 is a view illustrating that height distribution of the subject which was obtained by carrying out phase unwrapping.

FIG. 11

Figure 11:
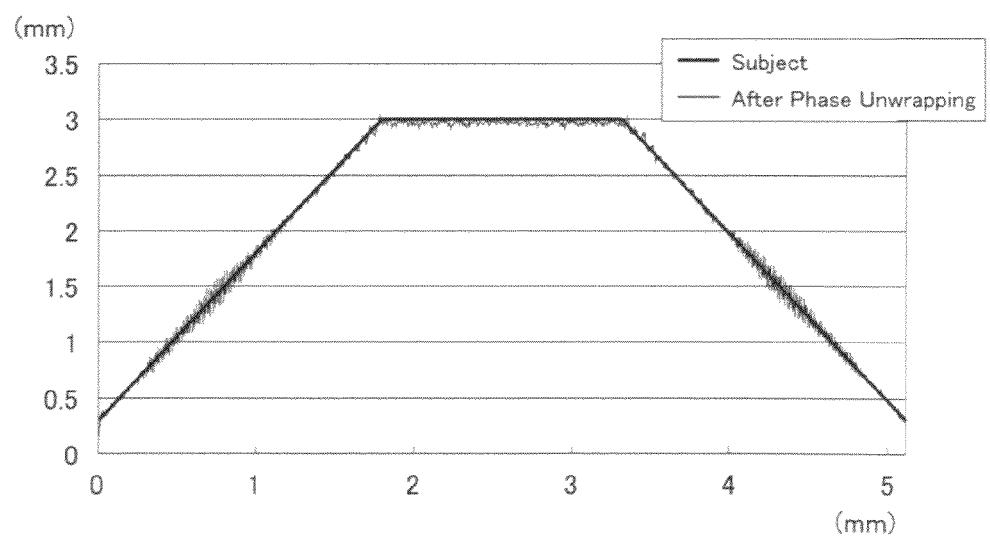

FIG. 11 is a view illustrating (i) an original height distribution of the subject along a straight line C in FIG. 10, and (ii) that height distribution of the subject which was obtained after phase unwrapping was carried out.

FIG. 12

Figure 12:
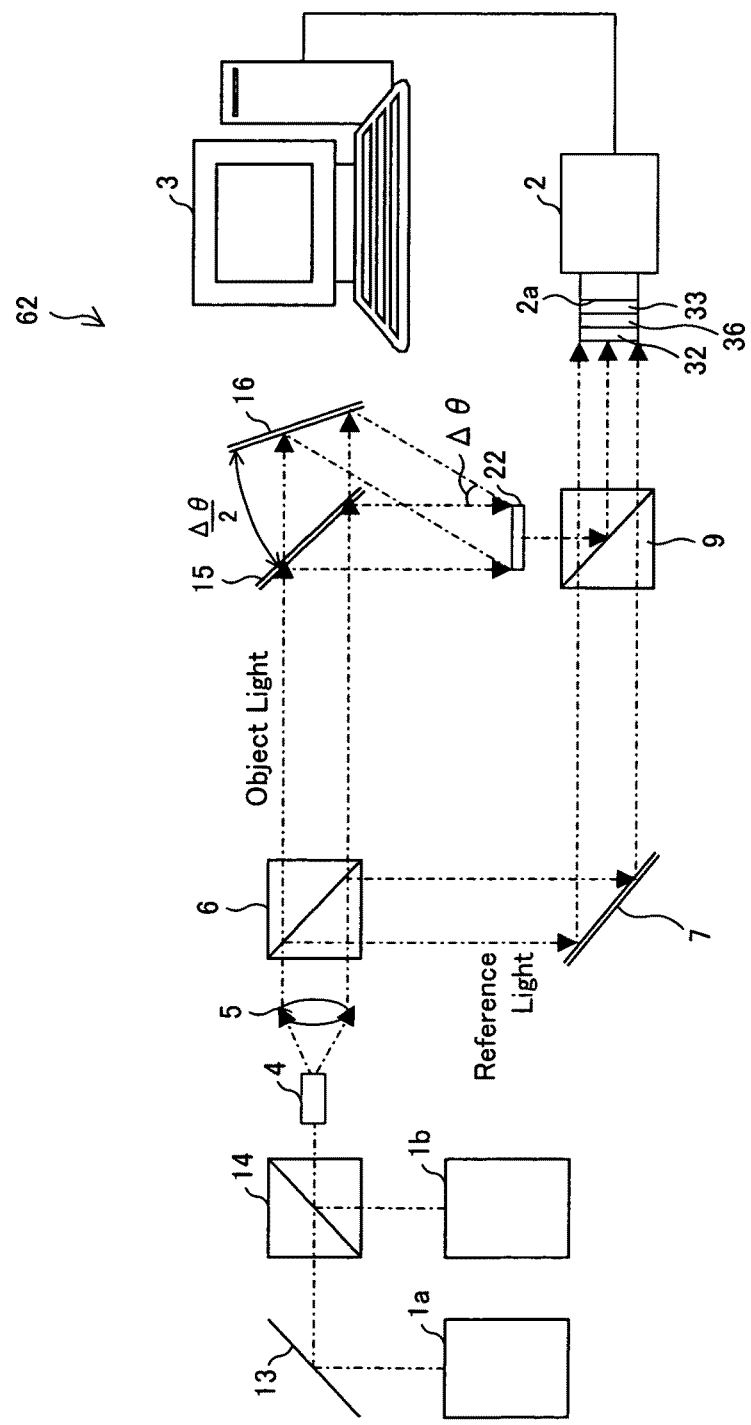

FIG. 12 is a schematic view illustrating an arrangement of a digital holography apparatus of another embodiment of the present invention.

FIG. 13

Figure 13:
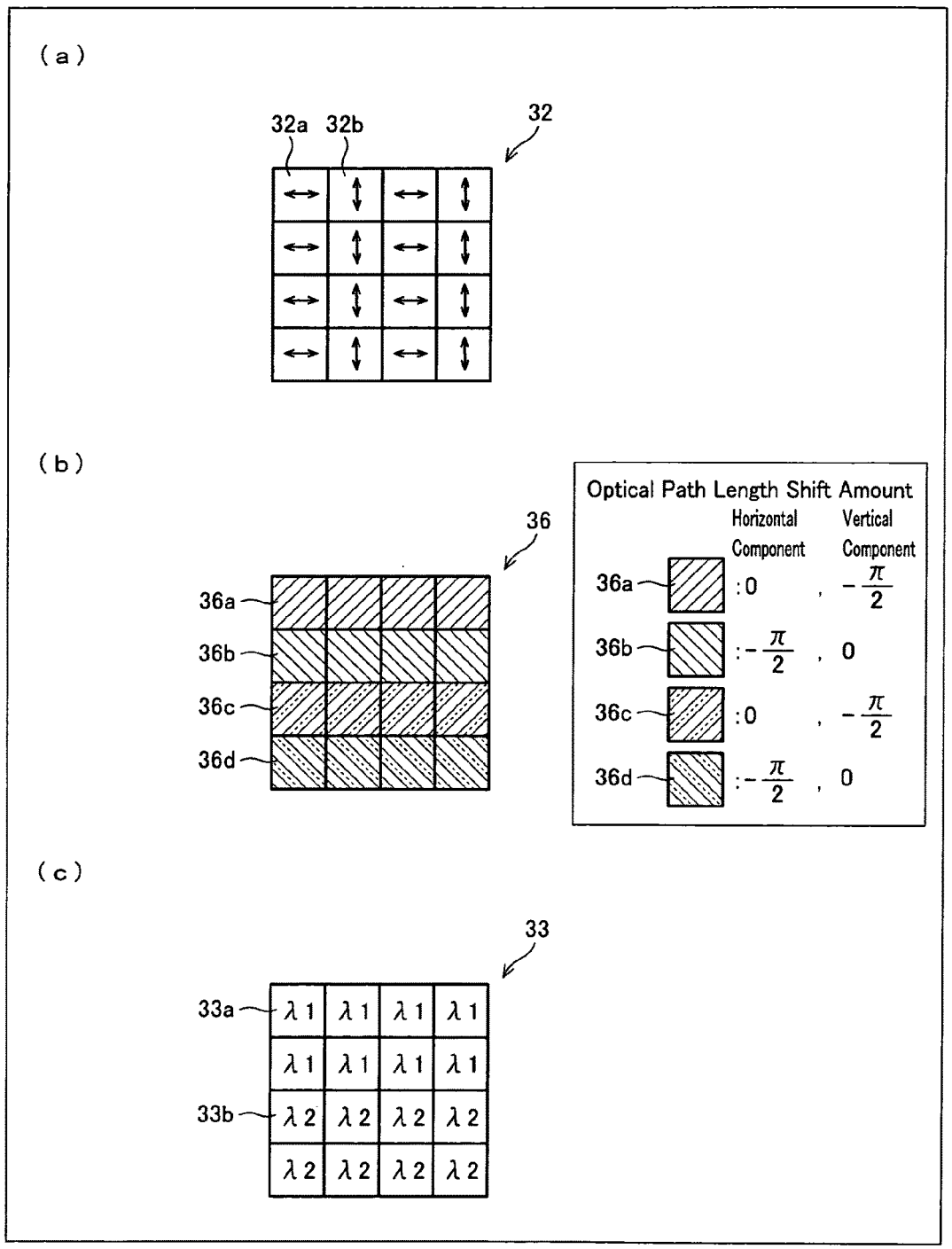

(a) of FIG. 13 is a schematic view illustrating a part of a polarizer array device provided in the digital holography apparatus. (b) of FIG. 13 is a schematic view illustrating a part of an optical path length-shifting array device provided in the digital holography apparatus. (c) of FIG. 13 is a schematic view illustrating a part of a wavelength-selecting filter provided in the digital holography apparatus.

FIG. 14

Figure 14:
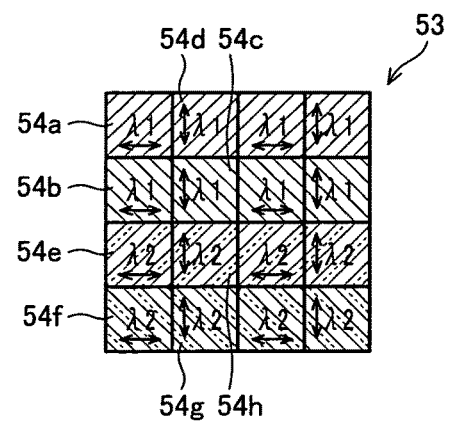

FIG. 14 is a view illustrating a part of an interference pattern obtained by the digital holography apparatus.

FIG. 15

Figure 15:
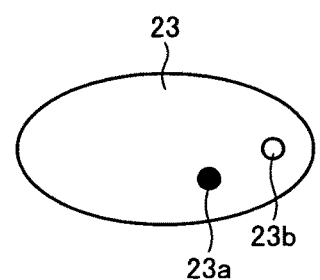

FIG. 15 is a schematic view illustrating the subject.

FIG. 16

Figure 16:
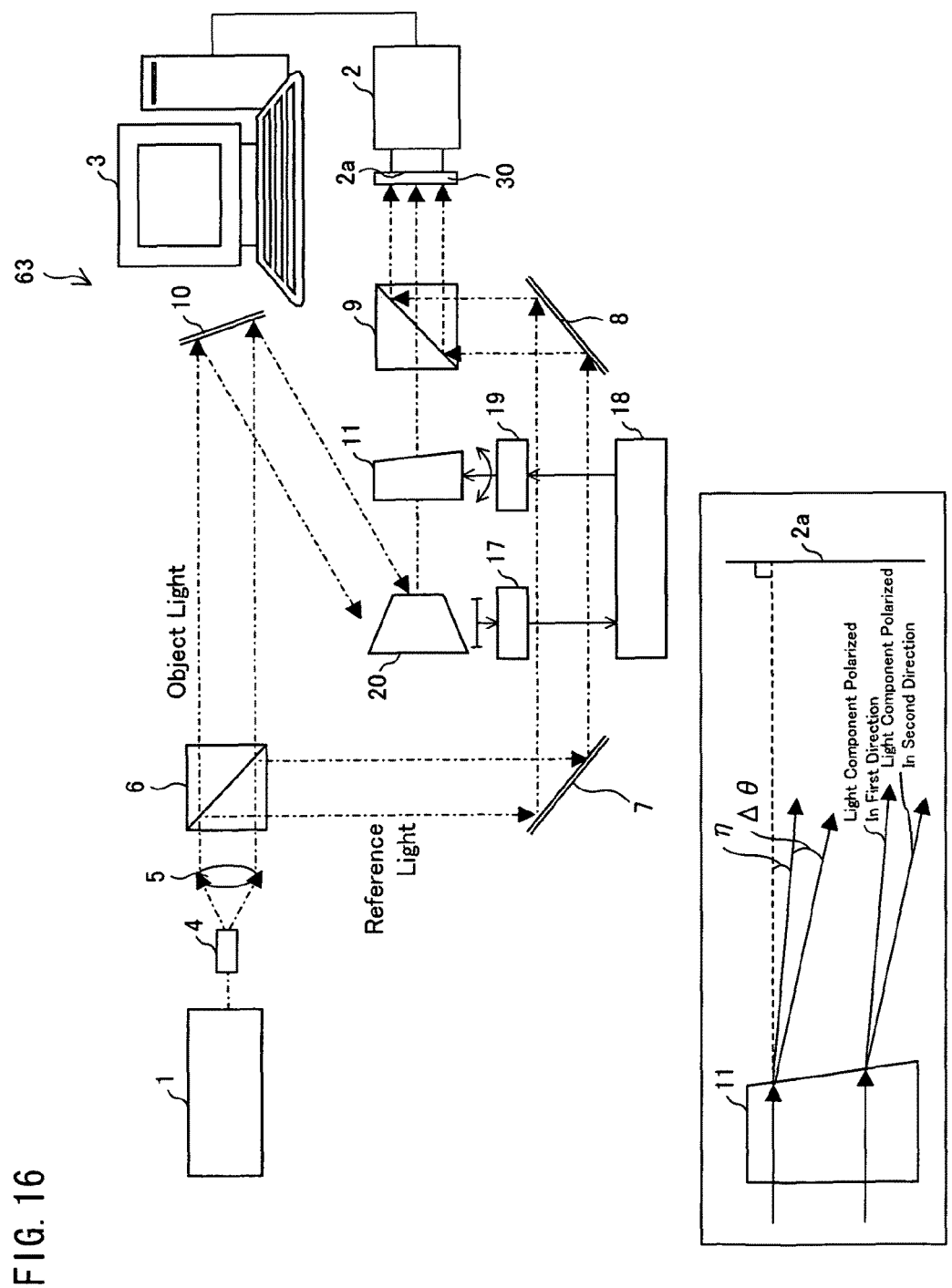

FIG. 16 is a schematic view illustrating an arrangement of a digital holography apparatus of another embodiment of the present invention.

FIG. 17

Figure 17:
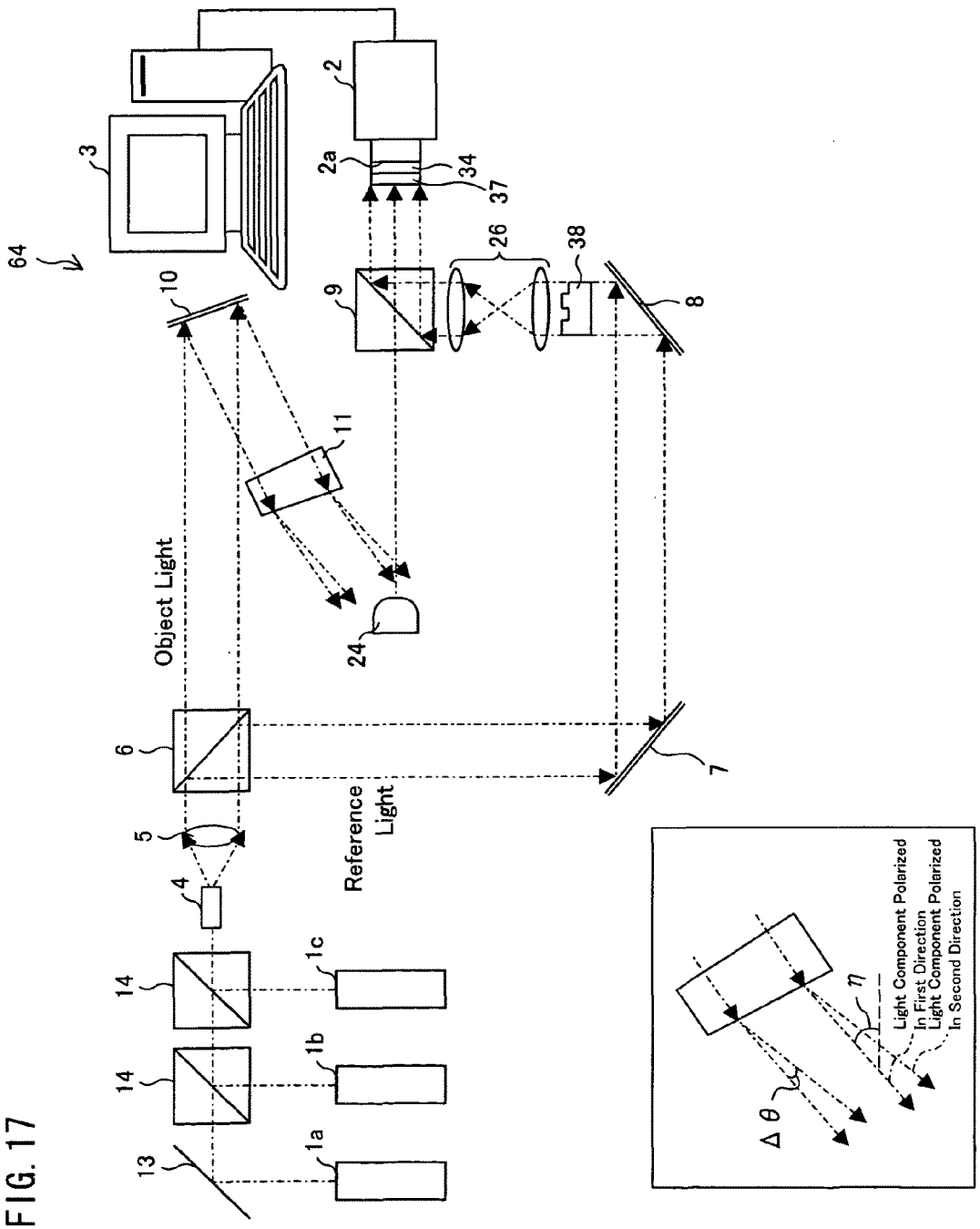

FIG. 17 is a schematic view illustrating an arrangement of a digital holography apparatus of another embodiment of the present invention.

FIG. 18

Figure 18:
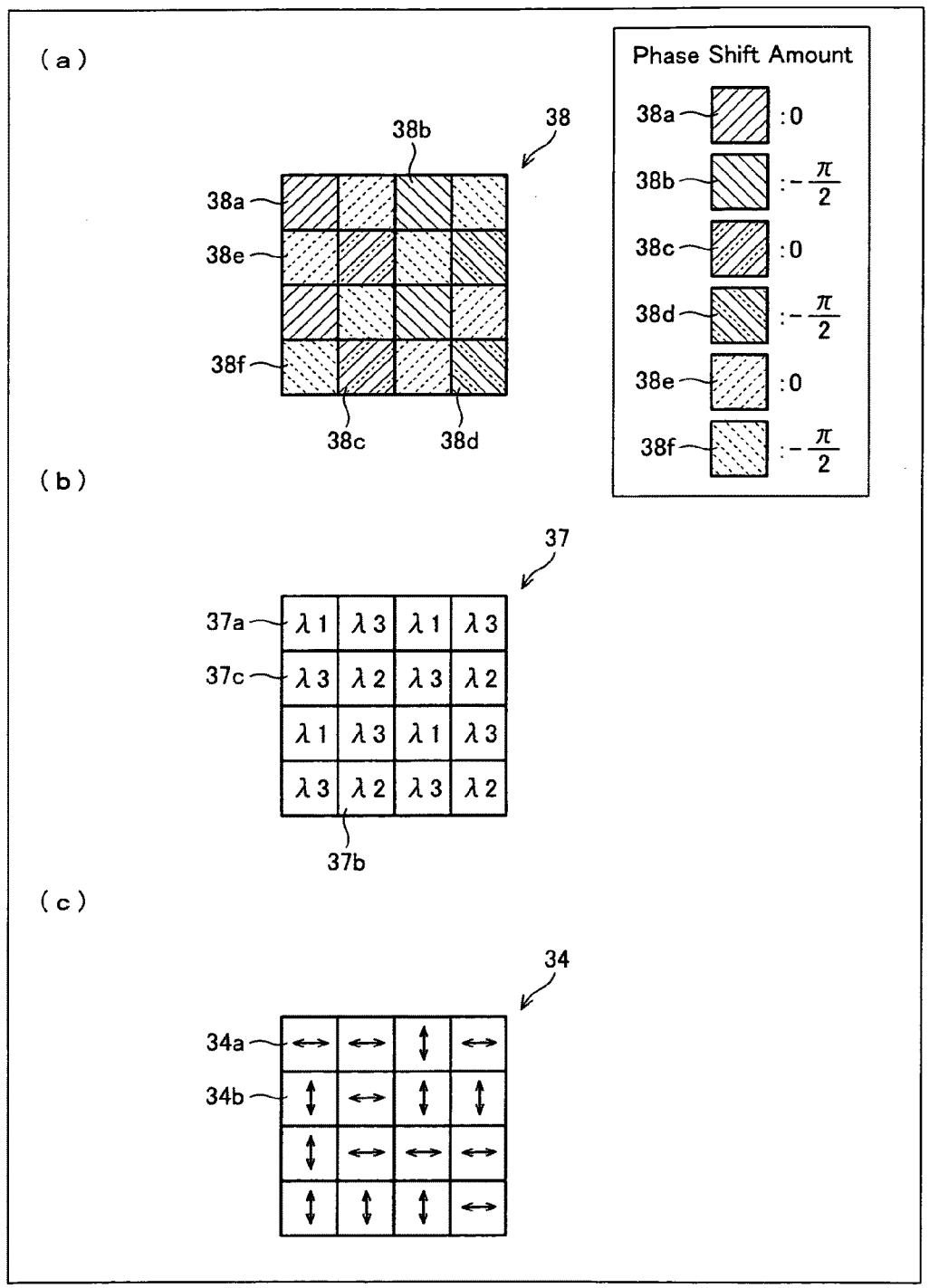

(a) of FIG. 18 is a schematic view illustrating a part of a phase-shifting array device provided in the digital holography apparatus. (b) of FIG. 18 is a schematic view illustrating a part of a wavelength-selecting filter provided in the digital holography apparatus. (c) of FIG. 13 is a schematic view illustrating a part of a polarizer array device provided in the digital holography apparatus.

FIG. 19

Figure 19:
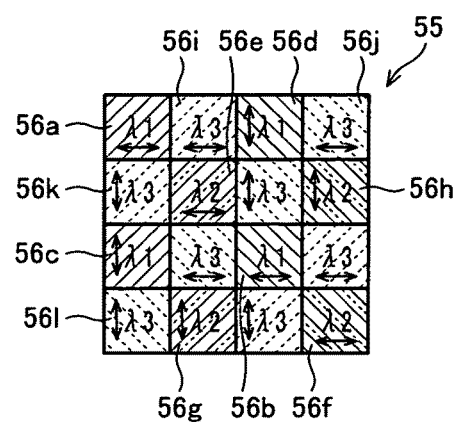

FIG. 19 is a view illustrating a part of an interference pattern obtained by the digital holography apparatus.

FIG. 20

Figure 20:
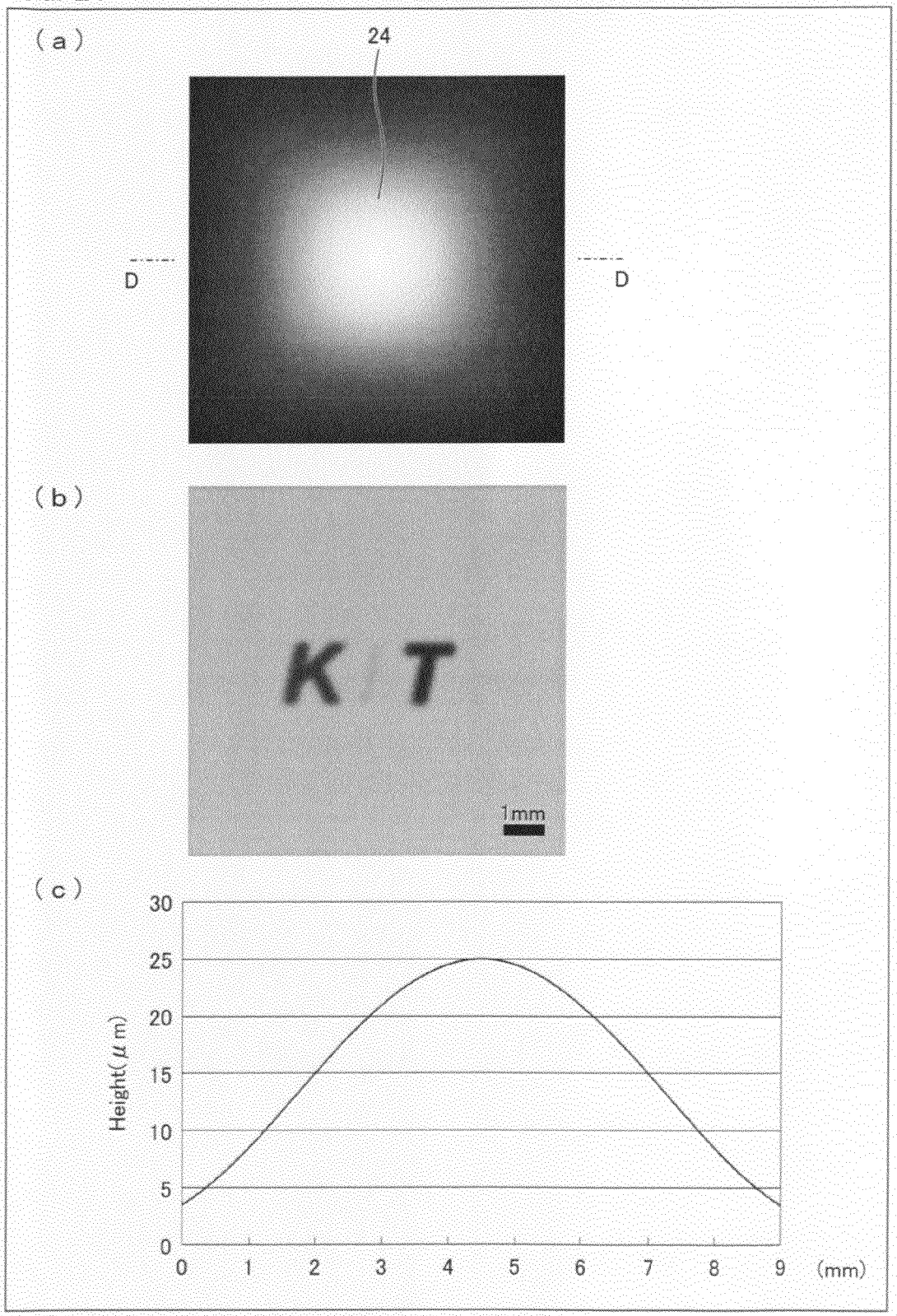

(a) of FIG. 20 is a view illustrating, by a bright area and a dark area, the height distribution of the subject. (b) of FIG. 20 is a view illustrating an amplitude distribution which visually indicates a bright area and a dark area of the subject. (c) of FIG. 20 is a view plotting the height distribution of the subject along a section line D in (a) of FIG. 20.

FIG. 21

Figure 21:
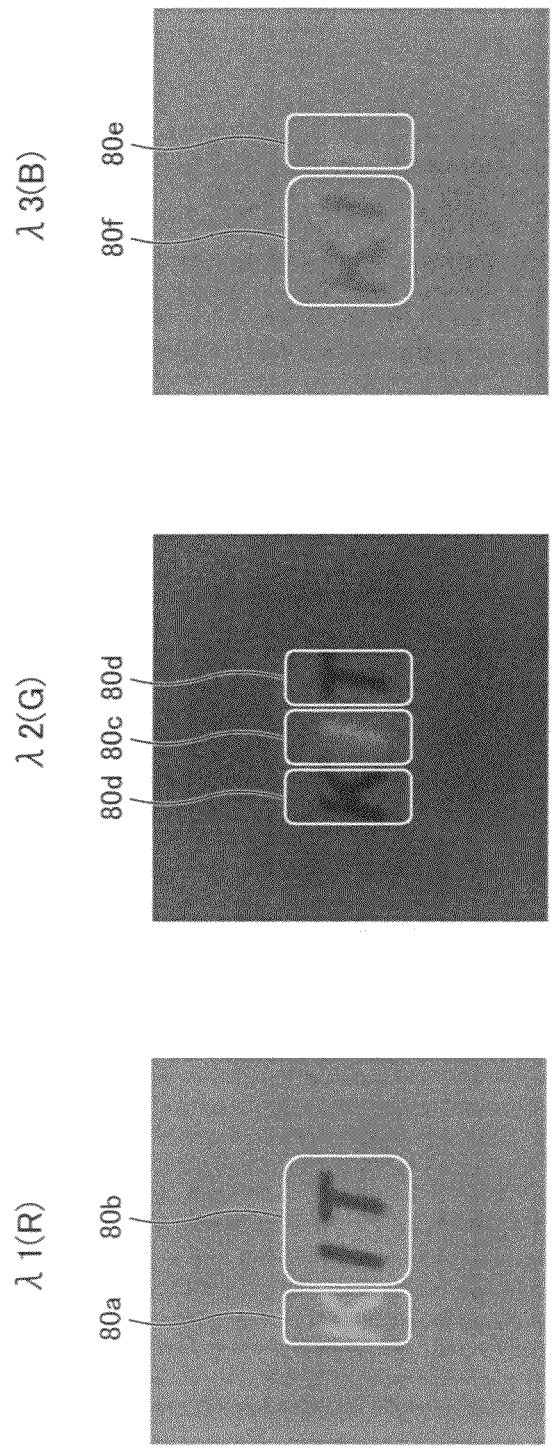

FIG. 21 is a view illustrating reconstructed images of the subject which were obtained for different wavelengths.

FIG. 22

Figure 22:
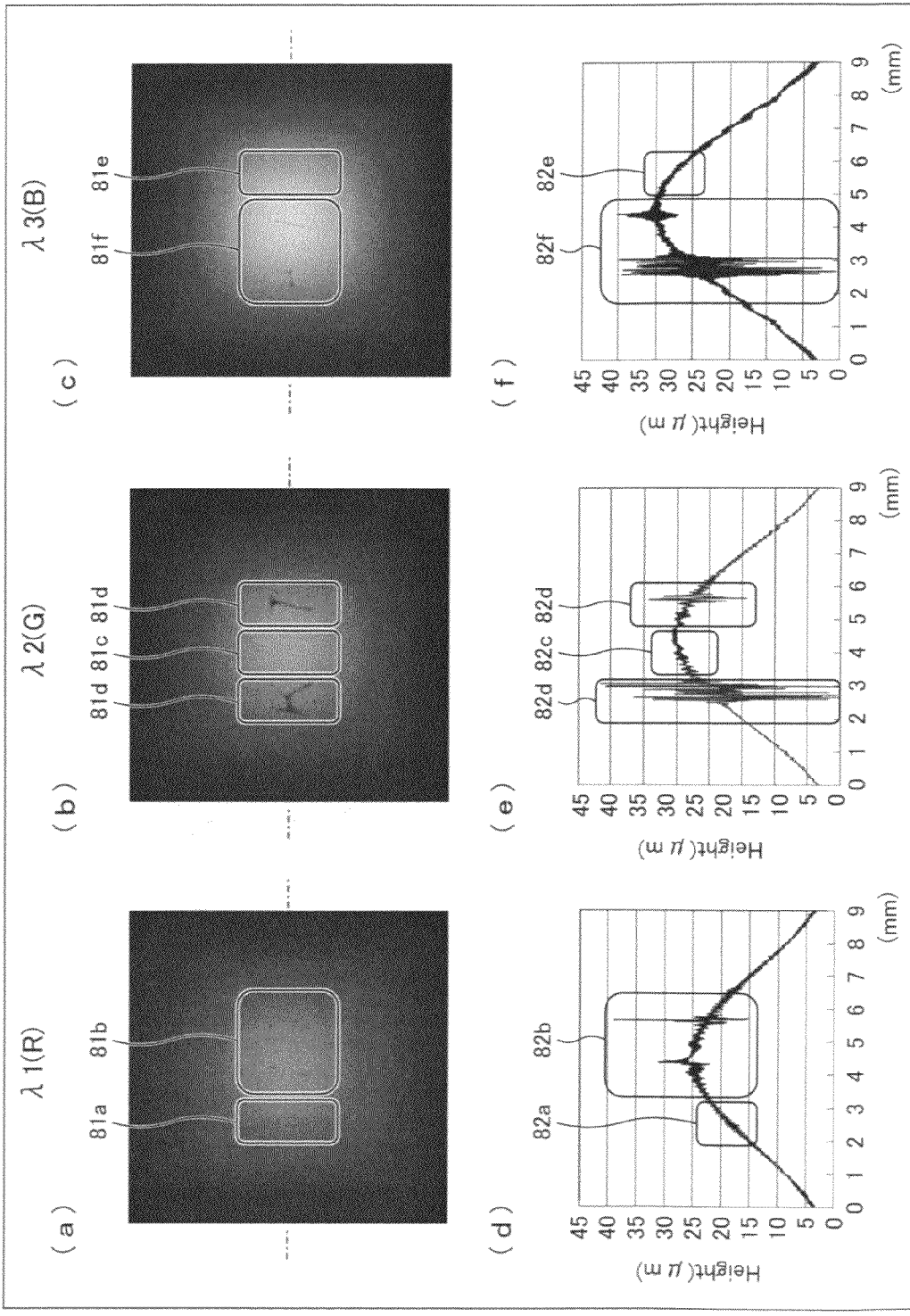

FIG. 22 is a view illustrating height distributions of the subject which were obtained by carrying out phase unwrapping separately with respect to each of the wavelengths.

FIG. 23

Figure 23:
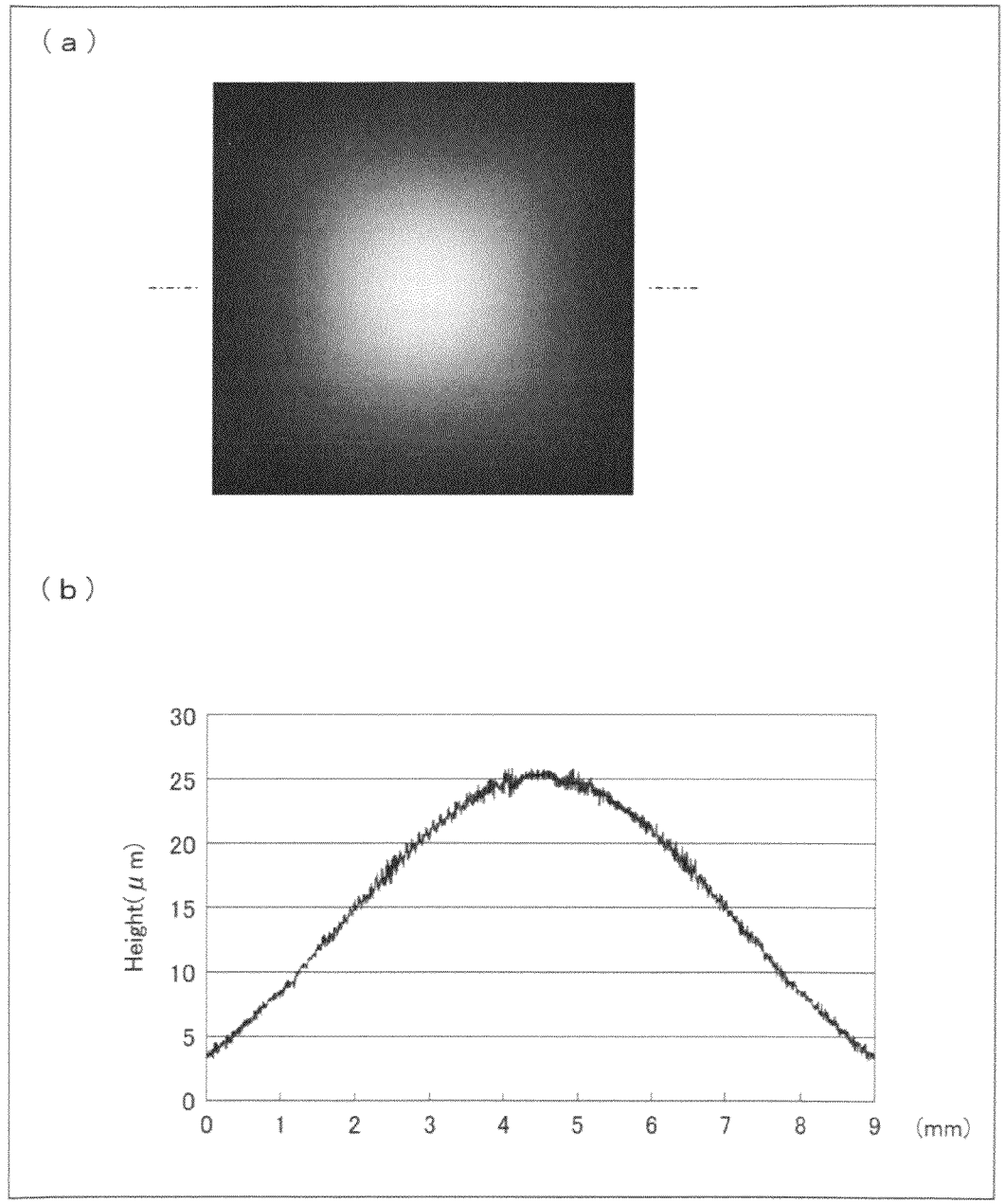

(a) of FIG. 23 is a view illustrating, by a bright area and a dark area, that height distribution of the subject which was obtained by carrying out a maximal amplitude value insertion process. (b) is a view illustrating a height distribution of the subject along a section line in (a) of FIG. 23.

FIG. 24

Figure 24:
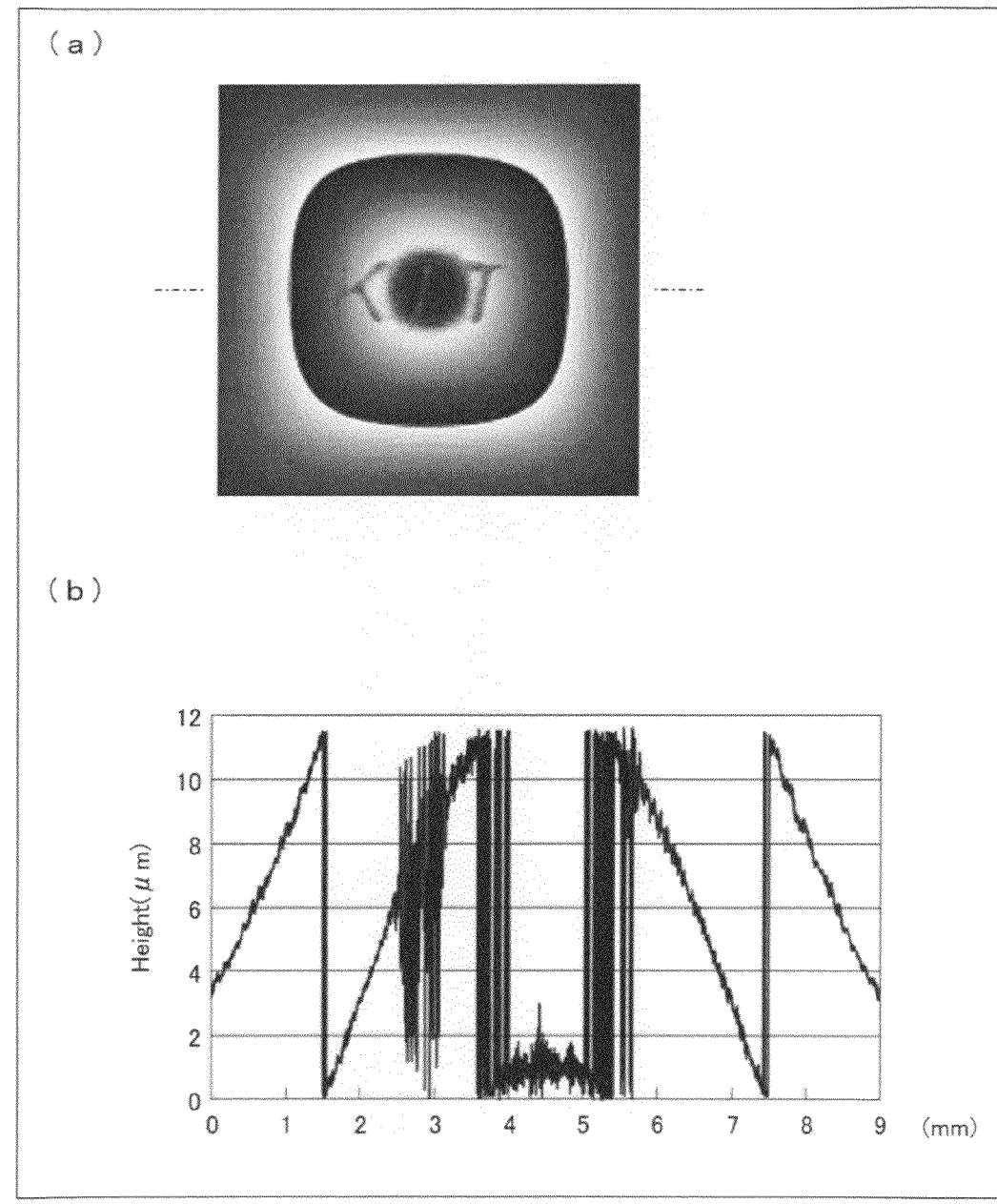

(a) of FIG. 24 is a view illustrating, by a bright area and a dark area, that height distribution of the subject which was obtained by carrying out a conventional plural wavelengths phase unwrapping technique. (b) is a view illustrating a height distribution of the subject along a section line in (a) of FIG. 24.

FIG. 25

Figure 25:
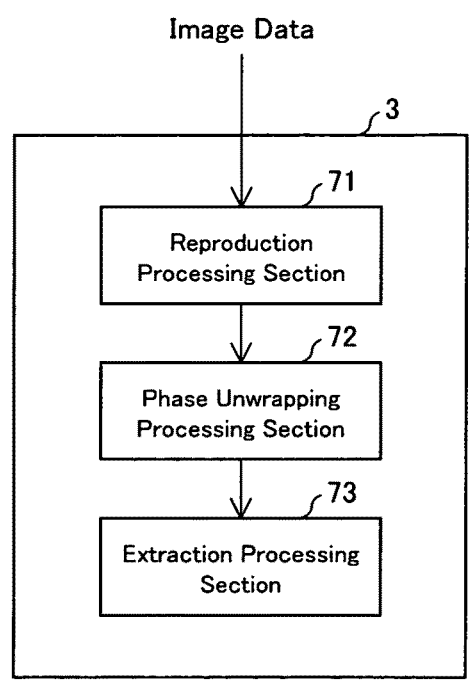

FIG. 25 is a block diagram illustrating an arrangement of a calculator provided in the digital holography apparatus.

FIG. 26

Figure 26:
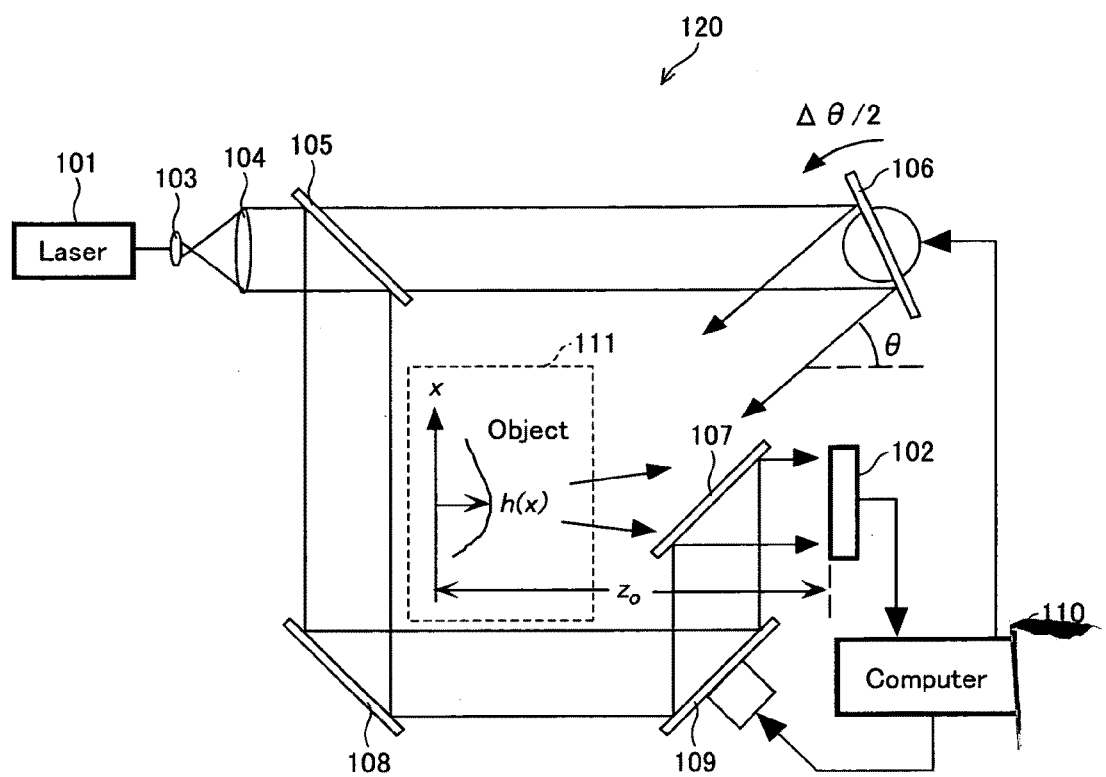

FIG. 26 is a schematic view illustrating an arrangement of a conventional digital holography apparatus.

DESCRIPTION OF EMBODIMENTS

The following describes embodiments of the present invention in detail, with reference to drawings.

[First Embodiment]

Figure 1:
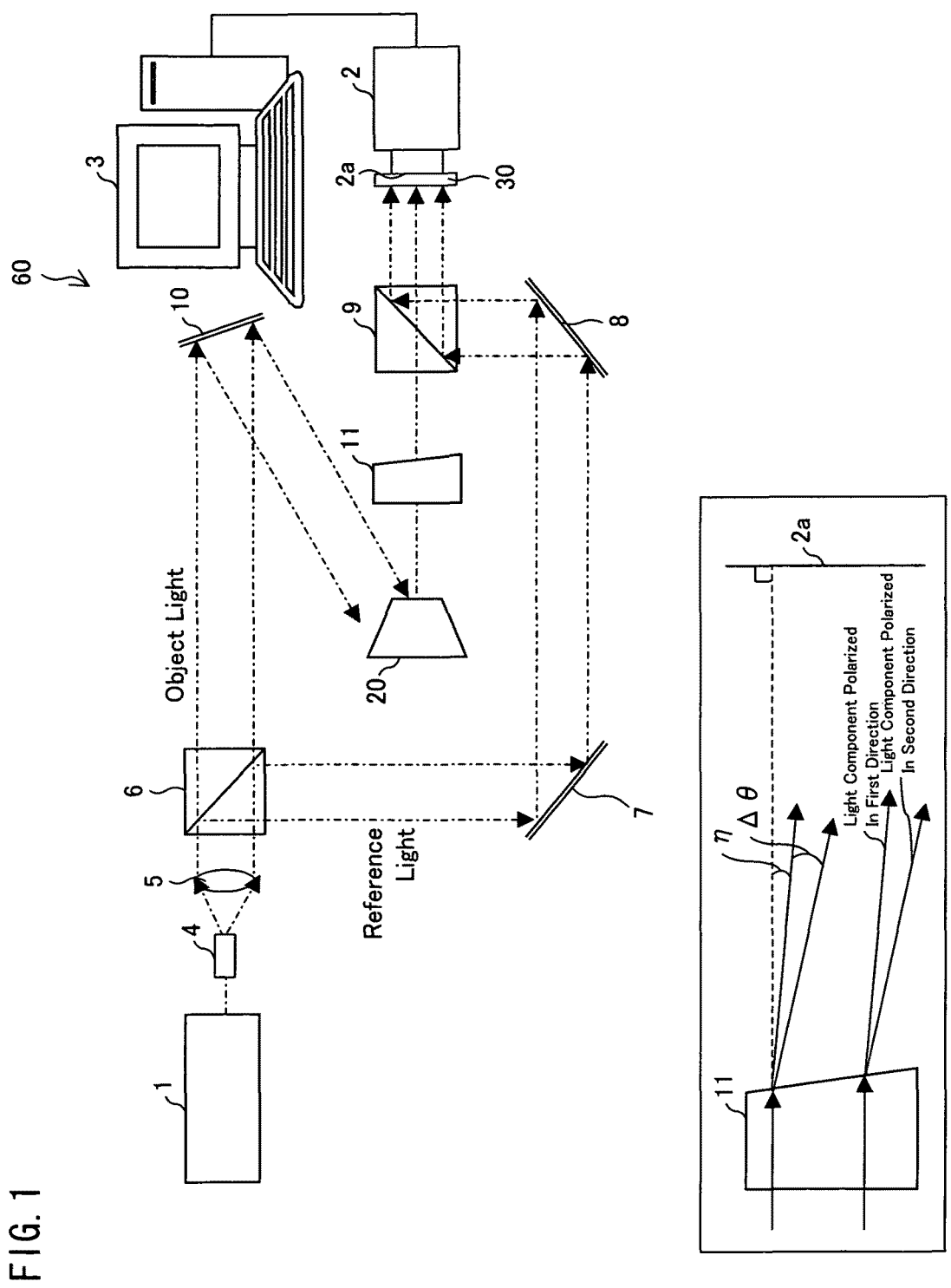
FIG. 1

FIG. 1 is a schematic view illustrating an arrangement of a digital holography apparatus (interference measurement apparatus) 60 of a first embodiment. The digital holography apparatus 60 includes an image-capturing apparatus having (i) an optical system which includes a laser light source (light source) 1, and (ii) an image-capturing element (image-capturing section) having an image-capturing plane 2a which image-capturing element is a CCD. The digital holography apparatus 60 further includes a calculator (reproducer section) 3 connected to an output of the image-capturing element 2.

The laser light source 1 generates coherent light, i.e., a laser beam. A direction perpendicular to a propagation direction of the laser beam is defined as a first direction, and a direction perpendicular to each of the propagation direction and the first direction is defined as a second direction. The laser beam is linearly-polarized light having a light component polarized in the first direction and a light component polarized in the second direction. The laser beam emitted from the laser light source 1 passes through a beam expander 4 and a collimator lens 5 so as to be a collimated laser beam. Then, the collimated laser beam is split into a reference light beam and an object light beam by a beam splitter (light splitting section) 6.

The reference light beam which is one of two split light beams is reflected by mirrors 7 and 8, and a beam-combining element 9 so as to reach the image-capturing plane 2a of the image-capturing element 2. The beam-combining element 9 includes a half mirror. The reference light is incident upon the image-capturing plane 2a not perpendicularly but at an angle of several degrees with respect to a straight line perpendicular to the image-capturing plane 2a.

The object light beam which is the other one of the two split light beams is reflected by a mirror 10 so as to be directed to a subject 20. The object light beam reflected by the subject 20 passes through a polarization splitting element (polarization splitting section) 11 which is made from a birefringent material. An incident surface and an exit surface of the polarization splitting element 11 are not parallel to each other. Accordingly, the object light beam which passes through the polarization splitting element 11 is split into two types of object light beams having respective different polarization directions. The two types of object light beams are emitted from the polarization splitting element 11 in different directions. That is, the polarization splitting element 11 causes an angular difference of $\Delta\theta$ between respective propagation directions of the two types of object light beams. According to the present embodiment, the object light beam is split by the polarization splitting element 11 into two types of object light beams, (i) a linearly-polarized object light beam having only a light component polarized in the first direction and (ii) a linearly-polarized object light beam having only a light component polarized in the second direction. The two types of object light beams emitted from the polarization splitting element 11 passes through the beam-combining element 9 so as to reach the image-capturing plane 2a of the image-capturing element 2.

Figure 2:
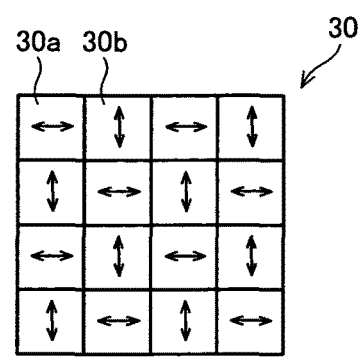
FIG. 2

The image-capturing element 2 includes a device 30 on a front surface of the image-capturing plane 2a in which device 30 polarizers are arranged in an array. Hereinafter, the device 30 is referred to as polarizer array device 30. FIG. 2 is a schematic view illustrating a part of the polarizer array device 30 from an image-capturing plane 2a side. The polarizer array device 30 is arranged such that polarizers (polarizer regions) 30a and 30b are arranged in a checkerboard pattern. The polarizers 30a extract, from light which passes through the polarizers 30a, only a light component polarized in a certain direction (in a horizontal direction in the present embodiment). On the other hand, the polarizers 30b extract, from light which passes through the polarizers 30b, only a light component polarized in a direction perpendicular to the certain direction above (in a vertical direction in the present embodiment). The reference light beam which is incident upon polarizer array device 30 has a horizontally-polarized light component and a vertically-polarized light component. In the present embodiment, the first direction corresponds to the horizontal direction, and the second direction corresponds to the vertical direction. That is, the polarizers 30a allow only one of the two types of object light beams to pass through which one of the two types of object light beams has a polarization direction identical with that of the polarizers 30a (i.e., horizontal direction). Similarly, the polarizers 30b allow only the other of the two types of object light beams to pass through which other of the two types of object light beams has a polarization direction identical with that of the polarizers 30b (i.e., vertical direction). In addition, the polarizers 30a allow only a light component of the reference light beam to pass through which light component is polarized in a direction identical with that of the polarizers 30a (i.e., horizontal direction). Similarly, the polarizers 30b allow only a light component of the reference light beam to pass through which light component is polarized in a direction identical with that of the polarizers 30b (i.e., vertical direction).

The two types of object light beams and the reference light beam, which have passed through the polarizer array device 30, are incident upon the image-capturing plane 2a behind the polarizer array device 30. Pixels on the image-capturing plane 2a measure light intensities corresponding to interference between the two types of object light beams and the reference light beam. Thus, the image-capturing element 2 captures an interference pattern which has been formed on the image-capturing plane 2a by the two types of object light beams and the reference light beam. Since the polarizer array device 30 is directly attached to the image-capturing plane 2a, each of the polarizers 30a and 30b corresponds to one pixel on the image-capturing plane 2a. That is, the polarizers 30a and 30b correspond to the pixels on the image-capturing plane 2a, respectively. The image-capturing element 2 has at least a resolution at which the image-capturing element 2 can recognize laser beams which have passed through the polarizers 30 and 30b. Accordingly, (i) pixels which measure light intensities corresponding to interference between a horizontally-polarized object light beam and a horizontally-polarized light component of a reference light beam and (ii) pixels which measure light intensities corresponding to interference between a vertically-polarized object light beam and a vertically-polarized light component of the reference light beam are arranged on the image-capturing plane 2a in the checkerboard pattern.

Figure 3:
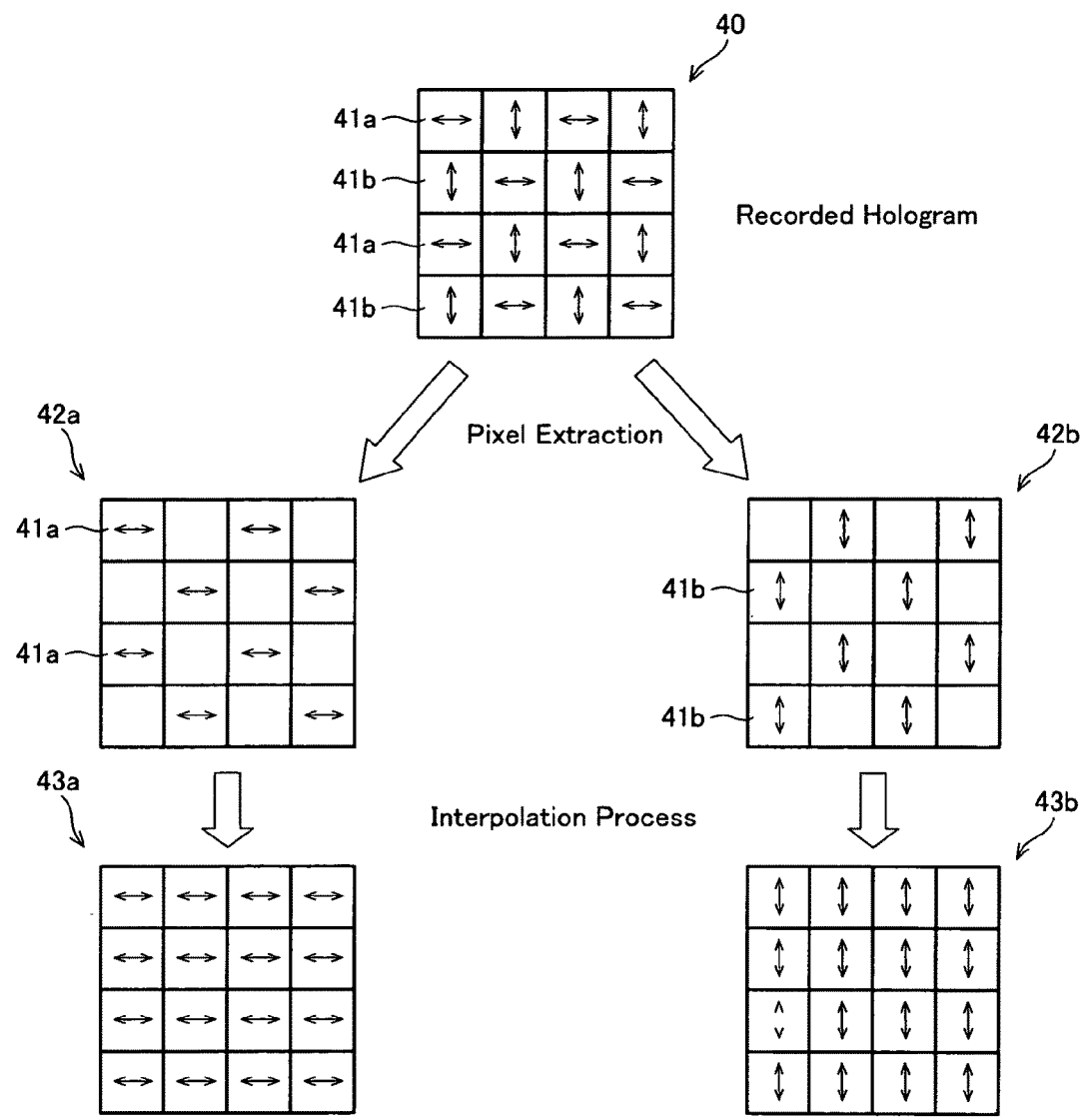
FIG. 3

FIG. 3 is a view for explanation of an image reconstruction algorithm of the digital holography apparatus 60. The calculator 3 (see FIG. 1) obtains, from the image-capturing element 2, image data indicative of an interference pattern (interference image) 40 captured by the image-capturing element 2. The interference pattern 40 is a hologram. FIG. 3 shows a part of the interference pattern 40 only.

The interference pattern 40 indicated by the image data contains both first interference information obtained by pixels 41a which have recorded horizontally-polarized light and second interference information obtained by pixels 41b which have recorded vertically-polarized light. The calculator 3 extracts the pixels 41a having the first interference information and the pixels 41b having the second interference information separately from each other. Thus, the calculator 3 obtains an interference pattern 42a which is a result of recording of the horizontally-polarized light and an interference pattern 42b which is a result of recording of the vertically-polarized light. Then, the calculator 3 interpolates values of missing pixels in the interference patterns 42a and 42b so as to obtain an interpolated interference pattern 43a and an interpolated interference pattern 43b.

Examples of interpolation methods encompass (i) a method in which a pixel value of a missing pixel is interpolated with a pixel value of any pixel adjacent to the missing pixel, (ii) a method in which linear interpolation (first interpolation and first extrapolation) is carried out by use of pixel values of a plurality of pixels around a missing pixel, and (iii) a method in which high-order interpolation and high-order extrapolation is carried out by use of pixel values of a plurality of pixels around a missing pixel.

The horizontally-polarized object light beam and the vertically-polarized object light beam are incident upon the image-capturing plane 2a at respective incident angles which are different by $\Delta\theta$. Accordingly, an interval between two interference fringes in the interpolated interference pattern 43a and an interval between two interference fringes in the interpolated interference pattern 43b are different from each other. A reconstructed image is found by use of the interpolated interference patterns 43a and 43b. Then, a position where the reconstructed image is formed is corrected in accordance with $\Delta\theta$. Then, phase unwrapping is carried out by use of a phase distribution obtained after the position where the reconstructed image is formed is corrected. Thus, information indicative of a three-dimensional shape of the subject 20 is obtained.

Thus, the digital holography apparatus 60 captures an image of the subject 20 only once so as to obtain the interference patterns 43a and 43b which are obtained by use of the horizontally-polarized object light beam and the vertically-polarized object light beam which are incident upon the image-capturing plane 2a at respective different incident angles. Accordingly, the phase unwrapping can be carried out by use of the interference patterns 43a and 43b. Thus, it is possible to obtain the three-dimensional information of the subject 20 by capturing the image of the subject 20 only once. This also makes it possible to obtain a three-dimensional information of a subject which dynamically changes.

The digital holography apparatus 60 includes an off-axis optical system. That is, there is an angular difference of several degrees between an optical axis of the object light beam incident upon the image-capturing plane 2a and an optical axis of the reference light beam incident upon the image-capturing plane 2a. As the angular difference increases, a region in an obtained reconstructed image increases in which region a zeroth-order diffraction image and a ±first-order diffraction image are not superimposed on each other. However, the interference fringes have smaller intervals on the image-capturing plane 2a. Therefore, such an increase of the region is limited due to a pixel spacing of the image-capturing element 2.

According to the present embodiment, the subject 20 is first irradiated with the object light beam, and then the object light beam reflected by the subject 20 is split by the polarization splitting element 11 into the two types of object light beams having respective different polarization directions, in order that there is an angular difference between respective propagation directions of the two types of object light beams. Alternatively, the object light beam can be split into the two types of object light beams before a subject is irradiated with the object light beam. That is, it can be arranged such that the subject is first irradiated with the two types of object light beams whose propagation directions are different in angle, and then the image-capturing element captures the two types of object light beams reflected by the subject. In this case, there is no need to correct, in accordance with $\Delta\theta$, a position where the reconstructed image is formed. Other calculations can be carried out in a same manner as a case where the subject is first irradiated with the object light beam, and then the object light beams reflected by the subject is split by the polarization splitting element into the two types of object light beams having respective different polarization directions. Thus, the phase unwrapping can be carried out. The laser beam which is emitted from the laser light source can be linearly-polarized light or circularly-polarized light.

Further, the first direction and the second direction, which are respective polarization directions of the two types of object light beams split by the polarization splitting element, are preferably perpendicular to each other. Note that even if the first direction and the second direction are not completely perpendicular to each other, the phase unwrapping can be still carried out although accuracy decreases. Similarly, light components which are extracted by the polarizers of the polarizer array device preferably have respective polarization directions identical with the first direction and the second direction, respectively. However, even if the polarization directions are not completely identical with the first direction and the second direction, the phase unwrapping can be still carried out although accuracy decreases. The phase unwrapping can be carried out with a high accuracy in case where the first direction and the second direction are perpendicular to each other, and light components which are extracted by the polarizers of the polarizer array device have respective polarization directions identical with the first direction and the second direction, as is the case with the present embodiment.

The present embodiment has dealt a digital holography apparatus utilizing holography. However, the present invention is applicable to common interference measurement apparatuses which do not utilize holography.

According to the present embodiment, the object light beam is reflected (scattered) by the subject so as to enters the image-capturing section. However, the present embodiment is not limited to this. That is, the object light beam can be reflected, scattered or diffracted by the subject, or can pass thorough the subject so as to reach the image-capturing section via the subject.

Further, the polarization splitting element can be made up of a half mirror, a polarizer, etc.

The present embodiment has exemplified the image-capturing element having a CCD, as an image-capturing section. However, the present embodiment is not limited to this. That is, a common image-capturing element can be employed as the image-capturing section. For example, a CMOS image sensor camera can be employed as the image-capturing section.

An imaging time of the image-capturing section is short mainly due to performance of the image-capturing element. Combining the image-capturing element with a nanosecond laser or the like makes it possible to further reduce the imaging time.

Data indicative of an interference pattern captured by the image-capturing element can be supplied to another calculator via a storage medium or a network so that the calculator finds a reconstructed image.

These alternative arrangements can also be employed in other embodiments.

The present embodiment has exemplified a case where a laser beam is used as a coherent undulation. However, the present embodiment is not limited to this.

[Second Embodiment]

The following describes a digital holography apparatus which includes an in-line optical system. For convenience of explanation, members and arrangements which have same functions as those in drawings described in the first embodiment are given common reference signs, and descriptions of such members and arrangements are not repeated below.

Figure 4:
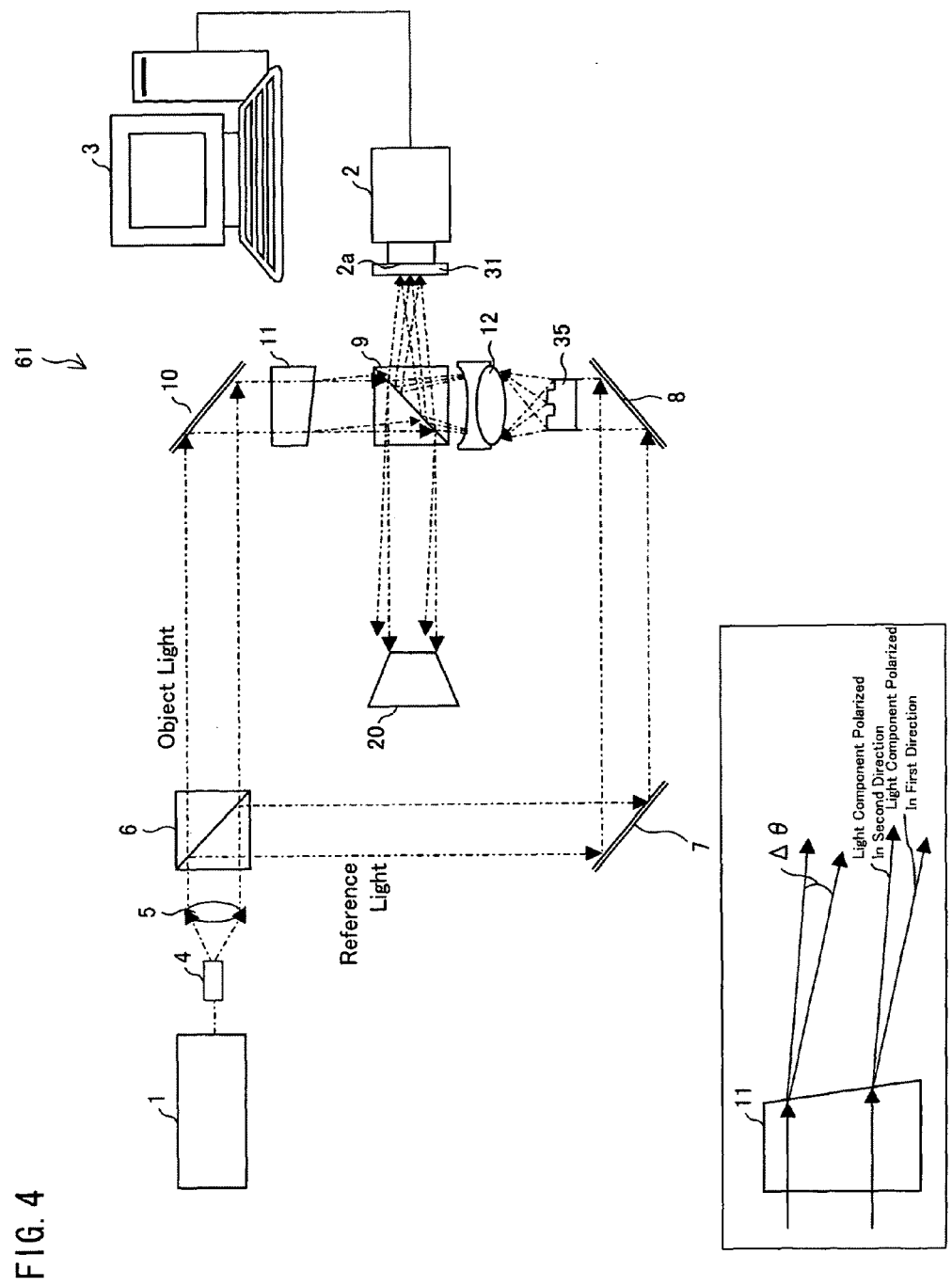
FIG. 4

FIG. 4 is a schematic view illustrating an arrangement of a digital holography apparatus (interference measurement apparatus) 61 of a second embodiment. The digital holography apparatus 61 includes an in-line optical system. An optical axis of a reference light beam which is incident upon an image-capturing plane 2a is perpendicular to the image-capturing plane 2a. A subject 20 is located optically right in front of the image-capturing plane 2a. It follows that a reconstructed image obtained by carrying out Fresnel transformation with respect to an interference pattern is made up of a zeroth-order diffraction image and a ±first-order diffraction image which are superimposed on each other. Therefore, it is necessary to combine phase-shifting techniques so as to separately obtain the zeroth-order diffraction image and the ±first-order diffraction image.

The digital holography apparatus 61 includes an image-capturing apparatus having (i) an optical system which includes a laser light source 1, and (ii) an image-capturing element 2 having an image-capturing plane 2a which image-capturing element 2 is a CCD. The digital holography apparatus 61 further includes a calculator 3 connected to an output of the image-capturing element 2. The image-capturing element 2 includes a polarizer array device 31 on a front surface of the image-capturing plane 2a.

The laser light source 1 generates a laser beam. A direction perpendicular to a propagation direction of the laser beam is defined as a first direction, and a direction perpendicular to each of the propagation direction and the first direction is defined as a second direction. The laser beam is linearly-polarized light having a light component polarized in the first direction and a light component polarized in the second direction. The laser beam emitted from the laser light source 1 passes through a beam expander 4 and a collimator lens 5 so as to be a collimated laser beam. Then, the collimated laser beam is split into a reference light beam and an object light beam by a beam splitter 6.

The digital holography apparatus 61 includes, between a mirror 8 and a beam-combining element 9, a phase-shifting array device (phase-shifting array section) 35 and an image-forming optical element 12, in order to split the reference light beam into a plurality of types of reference light beams having respective different phases.

(a) of FIG. 5 is a schematic view illustrating a part of the phase-shifting array device 35. The phase-shifting array device 35 has a plurality of regions which allow a laser beam to pass through so that the laser beam has different phases. Independently of its polarization direction, a portion of the reference light beam which portion has passed through a phase-shifting region 35b has, on a plane perpendicular to a traveling direction of the reference light beam, a phase shifted by $(-\pi/2)$ with respect to a phase of a portion of the reference light beam which portion has passed through a phase-shifting region 35a. For convenience, hereinafter, the portion of the reference light beam which portion has passed through the phase-shifting region 35a is referred to as reference light beam having a phase shift amount of 0, and the portion of the reference light beam which portion has passed through the phase-shifting region 35b is referred to as reference light beam having a phase shift amount of $(-\pi/2)$. In the phase-shifting array device 35, phase-shifting regions 35a which are arranged linearly and phase-shifting regions 35b which are arranged linearly are arranged alternately. The phase-shifting array device 35 is made from, e.g., glass so that a thickness of the phase-shifting regions 35a and a thickness of the phase-shifting regions 35b are different from each other.

The reference light beam which has passed through the phase-shifting array device 35 passes through the image-forming optical element 12. Then, the reference light beam is reflected by the beam-combining element 9. Then, the reference light beam passes through the polarizer array device 31. Then, the reference light beam is incident upon the image-capturing plane 2a so that an optical axis of the reference light beam is substantially perpendicular to the image-capturing plane 2a. The reference light beam which has passed through the phase-shifting array device 35 is diffracted. Then, the reference light beam passes through the image-forming optical element 12 so as to form an image on the image-capturing plane 2a. The image-forming optical element 12 includes a lens. For example, a portion of the reference light beam which has passed through one phase-shifting region 35a or 35b of the phase-shifting array device 35 forms an image on a pixel on any one of lines on the image-capturing plane 2a. That is, the portion of the reference light beam which portion has passed through one of cells, i.e., the phase-shifting regions 35a and 35b which are divided in a lattice pattern forms an image on any one of the pixels on the image-capturing plane 2a. In (a) of FIG. 5, the phase-shifting regions 35a and 35b of the phase-shifting array device 35 are regions divided in a lattice pattern. However, the phase-shifting array device 35 can have a stripe pattern.

The object light beam which is the other one of the two split light beams is reflected by the mirror 10 so as to pass through the polarization splitting element 11. According to the present embodiment, the object light beam is split by the polarization splitting element 11 into two types of object light beams, i.e., a linearly-polarized object light beam which has only a light component polarized in the first direction and a linearly-polarized object light beam which has only a light component polarized in the second direction. The two types of object light beams are different in propagation direction by the angular difference of $\Delta\theta$. Such two types of object light beams are reflected by the beam-combining element 9 so as to be directed, with the angular difference kept, to the subject 20. The object light beam reflected by the subject 20 passes through the beam-combining element 9 and the polarizer array device 31 so as to be incident upon the image-capturing plane 2a of the image-capturing element 2.

(b) of FIG. 5 is a schematic view illustrating a part of the polarizer array device 31 from an image-capturing plane 2a side. The polarizer array device 31 is arranged such that polarizers (polarizer regions) 31a and 31b are arranged in a checkerboard pattern. The polarizers 31a extract, from light which passes through the polarizers 31a, only a light component polarized in a certain direction (in a horizontal direction in the present embodiment). On the other hand, the polarizers 31b extract, from light which passes through the polarizers 31b, only a light component polarized in a direction perpendicular to the certain direction above (in a vertical direction in the present embodiment). The reference light beam which is incident upon the polarizer array device 31 has a horizontally-polarized light component and a vertically-polarized light component. In the present embodiment, the first direction corresponds to the horizontal direction, and the second direction corresponds to the vertical direction. That is, the polarizers 31a allow only one of the two types of object light beams to pass through which one of the two types of object light beams has a polarization direction identical with that of the polarizers 31a (i.e., horizontal direction). Similarly, the polarizers 31b allow only the other of the two types of object light beams to pass through which other of the two types of object light beams has a polarization direction identical with that of the polarizers 31b (i.e., vertical direction). In addition, the polarizers 31a allow only a light component of the reference light beam to pass through which light component is polarized in a direction identical with that of the polarizers 31a (i.e., horizontal direction). Similarly, the polarizers 31b allow only a light component of the reference light beam to pass through which light component is polarized in a direction identical with that of the polarizers 31b (i.e., vertical direction).

The two types of object light beams and the reference light beam, which have passed through the polarizer array device 31, are incident upon the image-capturing plane 2a behind the polarizer array device 31. Pixels on the image-capturing plane 2a measure light intensities corresponding to interference between the two types of object light beams and the reference light beam. Thus, the image-capturing element 2 captures an interference pattern (interference fringes) which has been formed on the image-capturing plane 2a by the two types of object light beams and the reference light beam. Since the polarizer array device 31 is directly attached to the image-capturing plane 2a, each of the polarizers 31a and 31b corresponds to one pixel on the image-capturing plane 2a. A portion of the reference light beam which portion has passed through one of the cells of the phase-shifting array device 35 which cells are divided in a lattice pattern in (a) of FIG. 5 passes through the image-forming optical element so as to form an image. Then, the portion of the reference light beam passes through one of the polarizers 31a and 31b of the polarizer array device 31. Accordingly, pixels are formed on the image-capturing plane 2a each of which pixels is formed so as to correspond to any one of four types of interference formed by a combination of (i) the two types of object light beams which are different in polarization direction and incident angle with respect to the subject 20 and (ii) the two types of reference light beam FIG. 6 is a view for explanation of an image reconstruction algorithm of the digital holography apparatus 61. The calculator 3 obtains, from the image-capturing element 2, image data indicative of an interference pattern (interference image) 44 captured by the image-capturing element 2. FIG. 6 shows a part of the interference pattern 44 only.

The interference pattern 44 formed on the image-capturing plane 2a contains four types of pixels, (i) pixels 45a where the horizontally-polarized object light beam and the horizontally-polarized light component of the reference light beam having a phase shift amount of 0 have interfered with each other, (ii) pixels 45b where the horizontally-polarized object light beam and the horizontally-polarized light component of the reference light beam having a phase shift amount of $(-\pi/2)$ have interfered with each other, (iii) pixels 45c where the vertically-polarized object light beam and the vertically-polarized light component of the reference light beam having a phase shift amount of 0 have interfered with each other, and (iv) pixels 45d where the vertically-polarized object light beam and the vertically-polarized light component of the reference light beam having a phase shift amount of $(-\pi/2)$ have interfered with each other.

The calculator 3 extracts the four types of pixels 45a, 45b, 45c, and 45d so as to obtain (i) an interference pattern 46a of the interference between the horizontally-polarized object light beam and the horizontally-polarized light component of the reference light beam having a phase shift amount of 0, (ii) an interference pattern 46b of the interference between the horizontally-polarized object light beam and the horizontally-polarized light component of the reference light beam having a phase shift amount of $(-\pi/2)$, (iii) an interference pattern 46c of the interference between the vertically-polarized object light beam and the vertically-polarized light component of the reference light beam having a phase shift amount of 0, and (iv) an interference pattern 46d of the interference between the vertically-polarized object light beam and the vertically-polarized light component of the reference light beam having a phase shift amount of $(-\pi/2)$.

Then, the calculator 3 interpolates values of missing pixels in each of the interference patterns 46a, 46b, 46c, and 46d so as to obtain interpolated interference patterns 47a, 47b, 47c, and 47d.

In order that a reconstructed image is obtained from the interpolated interference patterns 47a, 47b, 47c, and 47d, information on an intensity distribution of the reference light beam on the image-capturing plane 2a of the image-capturing element 2 is required. The intensity distribution of the reference light beam is constant. Accordingly, before or after the interference pattern of the subject 20 is captured, only the reference light beam is captured while the object light beam is blocked. The subject 20 is not necessary for obtaining the intensity distribution of the reference light beam. The calculator 3 obtains an intensity distribution 48 of the reference light beam from the image-capturing element 2, as is the case with the interference pattern 44. Since the reference light beam has passed through the polarizer array device 31, the intensity distribution 48 of the reference light beam contains both (i) pixels 49a indicative of intensities of the horizontally-polarized light component of the reference light beam and (ii) pixels 49b indicative of intensities of the vertically-polarized light component of the reference light beam.

The calculator 3 extracts the two types of pixels, the pixels 49a and 49b so as to obtain an intensity distribution 50a of the horizontally-polarized light component of the reference light beam and an intensity distribution 50b of the vertically-polarized light component of the reference light beam.

In a case where it is possible to assume or presume that the intensity distribution of the reference light beam is uniform, it is possible to omit to record the intensity distribution of the reference light beam, and generate, in signal processing for obtaining the reconstructed image, the intensity distribution of the reference light beam by use of the calculator 3.

Then, the calculator 3 interpolates values of missing pixels in each of the intensity distributions 50a and 50b so as to obtain an interpolated intensity distribution 51a of the horizontally-polarized light component of the reference light beam and an interpolated intensity distribution 51b of the vertically-polarized light component of the reference light beam.

It is possible to obtain a complex amplitude distribution 52a of the horizontally-polarized object light beam on the image-capturing plane 2a, by a two-step phase-shifting technique (Non-patent Literature 4), on the basis of (i) the interpolated interference patterns 47a and 47b which are different in phase shift amount and (ii) the interpolated intensity distribution 51a of the reference light beam. Similarly, it is possible to obtain a complex amplitude distribution 52b of the vertically-polarized object light beam on the image-capturing plane 2a, by the two-step phase-shifting technique, on the basis of (i) the interpolated interference patterns 47c and 47d which are different in phase shift amount and (ii) the interpolated intensity distribution 51b of the reference light beam.

On the basis of the complex amplitude distributions 52a and 52b thus obtained, diffraction integral is performed so that a phase distribution containing information on the reconstructed image and the three-dimensional shape of the subject 20 is obtained. Since the horizontally-polarized object light beam and the vertically-polarized object light beam are incident upon the subject 20 at respective incident angles which are different by $\Delta\theta$, the information on the three-dimensional shape of the subject 20 can be obtained by carrying out phase unwrapping on the basis of the complex amplitude distributions 52a and 52b which are different in propagation direction of the object light beam.

Thus, the digital holography apparatus 61 captures an image of the subject 20 only once so as to obtain the four types of interference patterns 46a through 46d which are different in incident angle with respect to the subject 20 and in phase shift amount. This makes it possible to carry out phase unwrapping on the basis of the two types of complex amplitude distributions 52a and 52b which are obtained on the basis of the four types of interference patterns 46a through 46d. This makes it possible to obtain the three-dimensional information of the subject 20 which dynamically changes.

<Simulation Result>

The inventors of the present invention conducted, by use of a calculator, simulation of phase unwrapping, in accordance with the present embodiment. The following describes a result of the simulation.

FIG. 4 illustrates an optical system which captures a subject. (a) of FIG. 7 is a view illustrating a height distribution of a subject 21 from the image-capturing element 2 side. In (a) of FIG. 7, a bright area and a dark area represent a height distribution of the subject 21 along its depth direction (i.e., direction perpendicular to the image-capturing plane 2a). The bright area (central part) is high in the depth direction, i.e., is closer to the image-capturing element 2. (b) of FIG. 7 is a cross-sectional view illustrating the subject 21 along a section line A in (a) of FIG. 7. The subject 21 has a shape of a quadrangular pyramid whose tip section has been cut off and which quadrangular pyramid has a square-shaped bottom surface having a size of 5.12 mm×5.12 mm. The subject 21 has a maximal height of 3.0 mm. (c) of FIG. 7 is a view corresponds to (a) of FIG. 7 which view illustrates an amplitude distribution which visually indicates bright areas and dark areas of the subject 21. That is, the subject 21 has a pattern of "KIT."

A wavelength of a laser beam generated by the laser light source 1 is 532 nm. The number of pixels of the image-capturing element 2 is 2048×2048. A pixel pitch is 5 μm. A distance between the image-capturing plane 2a of the image-capturing element 2 and the bottom surface of the subject 21 is 30 cm. A flat plate was provided behind the subject 21 so that the bottom surface of the subject serves as a reference plane. Further, a ratio of an intensity of the object light beam incident upon the image-capturing plane 2a to an intensity of the reference light beam incident upon the image-capturing plane 2a was arranged to be 1:7 for both their horizontally-polarized light components and their vertically-polarized light components. Further, an angle between the horizontally-polarized object light beam incident upon the subject 21 and a straight line perpendicular to the image-capturing plane 2a was arranged to be 0°, and an angle between the vertically-polarized object light beam incident upon the subject 21 and the straight line was arranged to be 1°. Under the conditions, a theoretical range $\Delta h$ in which phase unwrapping can be carried out is approximately 3.49 mm.

(a) of FIG. 8 is a view illustrating a reconstructed image (amplitude distribution) of the subject 21 which reconstructed image has been obtained from the horizontally-polarized object light beam under the conditions. (b) of FIG. 8 is a view illustrating a phase distribution corresponding to (a) of FIG. 8. (c) of FIG. 8 is a view illustrating a reconstructed image (amplitude distribution) of the subject 21 which reconstructed image has been obtained from the vertically-polarized object light beam under the conditions. (d) of FIG. 8 is a view illustrating a phase distribution corresponding to (c) of FIG. 8. In each of phase distributions illustrated in (b) and (d) of FIG. 8, information indicative of a position of the subject 21 along its height direction is folded into a wavelength range of the laser beam. Each of the phase distributions expresses height changes of the subject 21 as phases which are indicated by bright areas and dark areas.

FIG. 9 is a graph showing a phase distribution of the subject 21 which phase distribution was obtained, along a straight line B in (b) of FIG. 8, before the phase unwrapping was carried out. The information indicative of a position of the subject 21 along its height direction is folded into a wavelength range of the laser beam from 0 nm to 532 nm.

The phase unwrapping is carried out on the basis of the phase distributions of (b) and (d) of FIG. 8. This makes it possible to obtain an original height distribution of the subject 21 which original height distribution is not folded into the wavelength range. FIG. 10 is a view illustrating a height distribution of the subject 21 from the image-capturing element 2 side which height distribution was obtained by carrying out the phase unwrapping. In FIG. 10, bright areas and dark areas represent a height distribution of the subject 21 along its depth direction. A central bright area is high in the depth direction. FIG. 10 shows that the phase unwrapping made it possible to reconstruct the shape of the subject 21.

FIG. 11 is a graph showing (i) an original height distribution of the subject 21 along a straight line C in FIG. 10, and (ii) a height distribution of the subject 21 which height distribution was obtained after the phase unwrapping was carried out.

FIG. 11 shows that the phase unwrapping made it possible to reconstruct the shape of the subject 21 which has the maximal height of 3 mm along the depth direction.

According to the simulation result, an average error of the height distribution was $3.90 \times 10^{-2}$ mm, and a standard deviation of the height distribution was $2.99 \times 10^{-2}$ mm. A measurement accuracy can be further increased by improvement of a density of the pixels of the image-capturing element 2, a reduction in aliasing, or signal processing related to hologram reproduction.

According to the present embodiment, thus, a single light source which generates a laser beam having a single wavelength is adopted, and phase unwrapping is carried out on the basis of interference patterns obtained by capturing an image of a subject once. This makes it possible to obtain three-dimensional information of the subject which three-dimensional information covers a range wider than a wavelength of the laser beam. In the simulation, it was possible to obtain a measurement range whose height along the depth direction was more than 5000 times the wavelength of the laser beam. Since interference patterns necessary for the phase unwrapping can be obtained by one-time image capturing, it is possible to obtain three-dimensional information of a subject which dynamically changes. Accordingly, the digital holography apparatus has resistance to vibration. Since the phase unwrapping is carried out by use of the laser beam having a single wavelength, the digital holography apparatus can accurately measure a three-dimensional shape of a subject even if a reflectance, a transmittance, or a refractive index of the subject has a high wavelength dependency, as compared to a case where laser beams having a plurality of wavelengths are used. Further, the digital holography apparatus can be downsized and manufactured at a low cost since the digital holography apparatus can carry out measurement by use of a single light source only. Further, the digital holography apparatus does not require alignment of axes of laser beams which alignment is required in a case where a plurality of laser light sources are used, since the digital holography apparatus uses the single laser light source only. This makes it possible to suppress occurrence of a measurement error. As a result, it is possible to realize a digital holography apparatus having a high reliability.

The plurality of phase-shifting regions of the phase-shifting array device can be realized by adopting wavelength plates. Alternatively, the plurality of phase-shifting regions can be realized by adopting different thicknesses for the plurality of phase-shifting regions. Alternatively, the plurality of phase-shifting regions can be realized in such a manner that a liquid crystal element is provided to each of the plurality of phase-shifting regions so that an orientation of liquid crystal molecules is changed. Alternatively, the plurality of phase-shifting regions can be realized by adopting another birefringent material. Alternatively, the plurality of phase-shifting regions can be realized by adopting elements having structural birefringence.

[Third Embodiment]

The following describes a digital holography apparatus of a third embodiment. For convenience of explanation, members and arrangements which have same functions as those in drawings described in the second embodiment are given common reference signs, and descriptions of such members and arrangements are not repeated below.

FIG. 12 is a schematic view illustrating an arrangement of a digital holography apparatus (interference measurement apparatus) 62 of the third embodiment. The digital holography apparatus 62 includes an in-line optical system. An optical axis of a reference light beam which is incident upon an image-capturing plane 2a is perpendicular to the image-capturing plane 2a. A subject 22 is located optically right in front of the image-capturing plane 2a. This means that as viewed from the image-capturing element 2, the subject 22 looks as if the subject 22 is located right in front of the image-capturing element 2 since light from the subject 22 is reflected by the beam-combining element 9. In the present embodiment, accordingly, optical path length-shifting techniques are combined so that a zeroth-order diffraction image and a ±first-order diffraction image are separately obtained.

The digital holography apparatus 62 includes an optical system which includes two laser light sources 1a and 1b, and an image-capturing apparatus which includes an image-capturing element 2 having an image-capturing plane 2a which image-capturing element 2 is a CCD. The digital holography apparatus 62 further includes a calculator 3 connected to an output of the image-capturing element 2. The image-capturing element 2 includes, on a front surface of the image-capturing plane 2a, a polarizer array device 32, an optical path length-shifting array device 36, and a wavelength-selecting filter array 33.

The laser light sources 1a and 1b generate a first laser beam and a second laser beam which are different in wavelength, respectively. A wavelength of the first laser beam generated by the laser light source 1a is defined as λ1, and a wavelength of the second laser beam generated by the laser light source 1b is defined as λ2. The first laser beam emitted from the laser light source 1a is reflected by a mirror 13, and then combined, by a beam-combining element 14, with the second laser beam emitted from the laser light source 1b. An optical axis of the first laser beam which has passed through the beam-combining element 14 and an optical axis of the second laser beam reflected by the beam-combining element 14 coincide with each other.

A direction perpendicular to a propagation direction of the first laser beam and the second laser beam is defined as a first direction, and a direction perpendicular to each of the propagation direction and the first direction is defined as a second direction. Each of the first laser beam and the second laser beam is linearly-polarized light having a light component polarized in the first direction and a light component polarized in the second direction. Each of the first laser beam and the second laser beam passes through a beam expander 4 and a collimator lens 5 so as to be collimated light. Then, each of the first laser beam and the second laser beam is split by a beam splitter 6 into a reference light beam and an object light beam. Each of the reference light beam and the object light beam is made up of two laser beams which are different in wavelength.

The reference light beam reflected by a mirror 7 passes through the beam-combining element 9, the polarizer array device 32, the optical path length-shifting array device 36, and the wavelength-selecting filter array 33. As a result, the reference light beam is incident upon the image-capturing plane 2a so that an optical axis of the reference light beam is substantially perpendicular to the image-capturing plane 2a.

The object light beam which is the other one of two split light beams is split into two beams, by a polarization splitting element (polarization splitting section) 15 which includes a half mirror, in accordance with polarization directions. The polarization splitting element 15 can be made by attaching a polarizer to a back surface of a half mirror. Employment of a Brewster's angle as an incident angle of the object light beam with respect to the polarization splitting element 15 makes it possible to form a right angle between a polarization direction of a reflected portion of the object light beam and a polarization direction of a portion of the object light beam which portion passes through the polarization splitting element 15. The object light beam is split into two types of object light beams, i.e., (i) a linearly-polarized object light beam which has been reflected by the polarization splitting element 15 and has only a light component polarized in the first direction and (ii) a linearly-polarized object light beam which has passed through the polarization splitting element 15 and has only a light component polarized in the second direction. The linearly-polarized object light beam which has passed through the polarization splitting element 15 is reflected by the mirror 16 so as to be directed to the subject 22. The polarization splitting element 15 and the mirror 16 constitute a polarization splitting section. There is an angular difference of $(\Delta\theta/2)$ between the polarization splitting element 15 and the mirror 16. Accordingly, there is an angular difference of $\Delta\theta$ between respective propagation directions of the two types of object light beams. Note that there are four types of object light beams in consideration of the two different wavelengths.

The subject 22 is irradiated with the two types of object light beams between which there is the angular difference. The two types of object light beams are scattered or diffracted by the subject 22 when passing through the subject 22. The two types of object light beams scattered or diffracted by the subject 22 are reflected by the beam-combining element 9 so as to pass through the polarizer array device 32 and the wavelength-selecting filter array 33. As a result, the two types of object light beams are incident upon the image-capturing plane 2a.

(a) of FIG. 13 is a schematic view illustrating a part of the polarizer array device 32 from the image-capturing plane 2a side. The polarizer array device 32 is arranged such that polarizers (polarizer regions) 32a and 32b are arranged linearly. The polarizers 32a extract, from light which passes through the polarizers 32a, only a light component polarized in a certain direction (in a horizontal direction in the present embodiment). On the other hand, the polarizers 32b extract, from light which passes through the polarizers 32b, only a light component polarized in a direction perpendicular to the certain direction above (in a vertical direction in the present embodiment). The reference light beam which is incident upon the polarizer array device 32 has a horizontally-polarized light component and a vertically-polarized light component. In the present embodiment, the first direction corresponds to the horizontal direction, and the second direction corresponds to the vertical direction. That is, the polarizers 32a allow only one of the two types of object light beams to pass through which one of the two types of object light beams has a polarization direction identical with that of the polarizers 32a (i.e., horizontal direction). Similarly, the polarizers 32b allow only the other of the two types of object light beams to pass through which other of the two types of object light beams has a polarization direction identical with that of the polarizers 32b (i.e., vertical direction). In addition, the polarizers 32a allow only a light component of the reference light beam to pass through which light component is polarized in a direction identical with that of the polarizers 32a (i.e., horizontal direction). Similarly, the polarizers 32b allow only a light component of the reference light beam to pass through which light component is polarized in a direction identical with that of the polarizers 32b (i.e., vertical direction).

(b) of FIG. 13 is a schematic view illustrating a part of the optical path length-shifting array device 36 from the image-capturing plane 2a side. The optical path length-shifting array device 36 has a plurality of regions which allow a laser beam to pass through so that the laser beam has different optical path lengths. According to the present embodiment, optical path length-shifting regions 36a and 36b of the optical path length-shifting array device 36 are realized by adopting ¼ wavelength plates. Optical axes of ¼ wavelength plates for the optical path length-shifting regions 36a and those of ¼ wavelength plates for the optical path length-shifting regions 36b are perpendicular to each other. Fast axes of the optical path length-shifting regions 36a coincide with the horizontal direction, and slow axes of the optical path length-shifting regions 36a coincide with the vertical direction. Similarly, fast axes of the optical path length-shifting regions 36b coincide with the vertical direction, and slow axes of the optical path length-shifting regions 36b coincide with the horizontal direction. Accordingly, a horizontally-polarized portion of the reference light beam and a horizontally-polarized portion of the object light beam, which have passed through an optical path length-shifting region 36b, have phases shifted by $(-\pi/2)$ with respect to those of a horizontally-polarized portion of the reference beam and a horizontally-polarized portion of the object light beam which have passed through an optical path length-shifting region 36a. That is, an optical path difference corresponding to ¼ wavelength is caused. Similarly, a vertically-polarized portion of the reference light beam and a vertically-polarized portion of the object light beam, which have passed through an optical path length-shifting region 36a, have phases shifted by $(-\pi/2)$ with respect to those of a vertically-polarized portion of the reference beam and a vertically-polarized portion of the object light beam which have passed through an optical path length-shifting region 36b.

For convenience, hereinafter, an object light beam and a reference light beam each of which has a polarization direction identical with the slow axes of the optical path length-shifting regions 36a or 36b and has a phase shifted by $(-\pi/2)$ are referred to as an object light beam having an optical path length shift amount of $(-\pi/2)$ and a reference light beam having an optical path length shift amount of $(-\pi/2)$. Similarly, an object light beam and a reference light beam each of which has a polarization direction identical with the fast axes of the optical path length-shifting regions 36a or 36b are referred to as an object light beam having an optical path length shift amount of 0 and a reference light beam having an optical path length shift amount of 0.

The optical path length-shifting regions 36a and 36b are ¼ wavelength plates for a laser beam having a wavelength of $\lambda 1$. The optical path length-shifting regions 36c and 36d are ¼ wavelength plates for a laser beam having a wavelength of $\lambda 2$ which ¼ wavelength plates correspond respectively to the optical path length-shifting regions 36a and 36b.

In the optical path length-shifting array device 36, the following four lines of optical path length-shifting regions, optical path length-shifting regions 36a, 36b, 36c, and 36d, are arranged in this order.

(c) of FIG. 13 is a schematic view illustrating a part of the wavelength-selecting filter array 33 from the image-capturing plane 2a side. The wavelength-selecting filter array 33 is a filter which selectively allows, in accordance with a wavelength, light to pass through. In the wavelength-selecting filter array 33, first wavelength-selecting regions 33a which allow light having a wavelength of $\lambda 1$ to pass through but block light having a wavelength of $\lambda 2$, and second wavelength-selecting regions 33b which allow light having a wavelength of $\lambda 2$ to pass through but block light having a wavelength of $\lambda 1$ are arranged.

The object light beam and the reference light beam which have passed through the wavelength-selecting filter array 33 is incident upon the image-capturing plane 2a provided behind the wavelength-selecting filter array 33. Light intensities according to interference between the object light beam and the reference light beam are measured by the pixels of the image-capturing plane 2a. Thus, the image-capturing element 2 captures an interference pattern (interference fringes) which has been formed on image-capturing plane 2a by the object light beam and the reference light beam. The polarizer array device 32, the optical path length-shifting array device 36, the wavelength-selecting filter 33, and the image-capturing plane 2a are directly attached to each other in this order. Accordingly, (i) cells corresponding to the polarizers 32a and 32b which are divided in a lattice pattern, (ii) cells corresponding to the optical path length-shifting regions 36a and 36b which are divided in a lattice pattern, and (iii) cells corresponding to the wavelength-selecting regions 33a and 33b which are divided in a lattice pattern correspond to the pixels of the image-capturing plane 2a, respectively.

Accordingly, the image-capturing plane 2a has 8 types of pixels which capture 8 types of interference patterns which are formed by combination of two types of wavelengths, two types of polarization directions, and two types of optical path lengths (i.e., phase difference). In addition, the two types of object light beams are incident upon the subject 22 at two different incident angles, as is the case with the two types of polarization directions.

FIG. 14 is a view illustrating a part of an interference pattern 53 which can be obtained by the digital holography apparatus 62. The calculator 3 obtains, from the image-capturing element 2, image data indicative of the interference pattern (hologram) 53 captured by the image-capturing element 2.

The interference pattern 53 formed on the image-capturing plane 2a contains the following 8 types of pixels, (i) pixels 54a where the horizontally-polarized object light beam having an optical path length shift amount of 0 and a wavelength of $\lambda 1$ and the horizontally-polarized light component of the reference light beam have interfered with each other, (ii) pixels 54b where the horizontally-polarized object light beam having an optical path length shift amount of $(-\pi/2)$ and a wavelength of $\lambda 1$ and the horizontally-polarized light component of the reference light beam have interfered with each other, (iii) (iii) pixels 54c where the vertically-polarized object light beam having an optical path length shift amount of 0 and a wavelength of $\lambda 1$ and the vertically-polarized light component of the reference light beam have interfered with each other, (iv) pixels 54d where the vertically-polarized object light beam having an optical path length shift amount of $(-\pi/2)$ and a wavelength of $\lambda 1$ and the vertically-polarized light component of the reference light beam have interfered with each other, (v) pixel 54e where the horizontally-polarized object light beam having an optical path length shift amount of 0 and a wavelength of $\lambda 2$ and the horizontally-polarized light component of the reference light beam have interfered with each other, (vi) pixels 54f where the horizontally-polarized object light beam having an optical path length shift amount of $(-\pi/2)$ and a wavelength of $\lambda 2$ and the polarized-polarized light component of the reference light beam have interfered with each other, (vii) pixels 54g where the vertically-polarized object light beam having an optical path length shift amount of 0 and a wavelength of $\lambda 2$ and the vertically-polarized light component of the reference light beam have interfered with each other, and (viii) pixels 54h where the vertically-polarized object light beam having an optical path length shift amount of $(-\pi/2)$ and a wavelength of $\lambda 2$ and the vertically-polarized light component of the reference light beam have interfered with each other.

The calculator 3 extracts the 8 types of pixels 54a through 54h so as to obtain, with respect to the two types of wavelengths, interference patterns such as those illustrated in FIG. 6. By use of the optical path length-shifting technique instead of the phase-shifting technique, it is possible to obtain the reconstructed image and the three-dimensional information of the subject 22 in a manner similar to the above. In this case, phase unwrapping can be carried out on the basis of two types of complex amplitude distributions which are different in optical path length between the subject 22 and the image-capturing element 2 which two types of complex amplitude distributions are obtained by carrying out the optical path length-shifting technique with respect to the two types of wavelengths.

According to the present embodiment, the subject 22 is observed and measured by using, at a time, the two laser beams which are different in wavelength. Accordingly, even if a transmittance, a reflectance, or the like of the subject 22 has a wavelength dependency, it is still possible to measure the subject 22, provided that it is possible to capture an object light beam having any one of the two types of wavelengths which is not absorbed by the subject 22. Thus, increasing the number of wavelengths of laser beams to be used makes it possible to obtain three-dimensional information of a subject having various kinds of wavelength dependencies. In other words, one-time image capturing allows spectroscopic three-dimensional measurement.

As an application example, it is conceivable that the digital holography apparatus 62 is used in, e.g., observation of an internal substance of a cell of a living organism. A cell metabolite can be generated and decomposed in a short time. Therefore, it is important to carry out image capturing in a short time. Further, metabolites have various kinds of wavelength dependencies, depending on their types. Therefore, measurement utilizing a single wavelength does not allow observation and measurement of such metabolites at a time. In contrast, the present embodiment allows observation and measurement of such metabolites at a time.

FIG. 15 is a schematic view illustrating a subject 23. The object 23 contains substances 23a and 23b which are different in wavelength dependency. The substance 23a does not scatter light having a wavelength of $\lambda 1$. Accordingly, it is impossible to measure the substance 23a by use of the light having a wavelength of $\lambda 1$. In contrast, the substance 23b does not scatter light having a wavelength of $\lambda 2$. Accordingly, it is impossible to measure the substance 23b by use of the light having a wavelength of $\lambda 2$.

In a case where three-dimensional measurement is carried out with respect to the subject 23 by use of laser beams having two wavelengths of $\lambda 1$ and $\lambda 2$ in accordance with the present embodiment, positional information of the substance 23b can be obtained from an interference pattern of the laser beam having a wavelength of $\lambda 1$, and positional information of the substance 23a can be obtained from an interference pattern of the laser beam having a wavelength of $\lambda 2$. This makes it possible to obtain the positional information of the substances 23a and 23b by one-time image capturing, i.e., at a time.

Even if the substances 23a and 23b are, e.g., metabolites, and generated substances 23a and 23b are decomposed in a short time, it is still possible to examine correlation between the two substances 23a and 23b by obtaining their three-dimensional positional information of a certain moment.

[Fourth Embodiment]

The following describes a digital holography apparatus of a fourth embodiment. For convenience of explanation, members and arrangements which have same functions as those in drawings described in the first embodiment are given common reference signs, and descriptions of such members and arrangements are not repeated below.

FIG. 16 is a schematic view illustrating an arrangement of a digital holography apparatus (interference measurement apparatus) 63 of the fourth embodiment. The digital holography apparatus 63 is arranged in accordance with the first embodiment, except that a size measuring section 17, a control section 18, and an angular difference adjusting section 19 are additionally provided.

Before measurement utilizing a reference light beam and an object light beam is carried out, the size measuring section 17 measures an approximate size of a subject 20 along the depth direction as viewed from the image-capturing element 2. The control section 18 obtains the size of the subject 20 from the size measuring section 17.

A range in which phase unwrapping can be carried out depends on $\Delta\theta$ and $\eta$. $\eta$ is an angle formed by any one of two types of object light beams split by a polarization splitting element (polarization splitting section) 11 with respect to an axis perpendicular to the image-capturing plane $2a$. $\Delta\theta$ is an angular difference between propagation directions of the two types of object light beams which are different in propagation direction. $\lambda$ is defined as a wavelength of a laser beam. k is defined as a wave number of the laser beam. x is defined as a coordinate of an axis perpendicular to the depth direction. h(x) is defined as a height distribution along the depth direction of the subject 20. A phase distribution $\phi_1$ of a reconstructed image of a subject which reconstructed image is obtained from an interference pattern of a certain polarization direction is expressed by the following equation.

$$\phi_1 = k\{x \sin \eta + h(x)\cos \eta\}$$

A phase distribution $\phi_2$ of a reconstructed image of the subject which reconstructed image is obtained from an interference pattern of a polarization direction perpendicular to the certain polarization direction is expressed by the following equation.

$$\phi_2 = k\{x \sin(\eta+\Delta\theta) \times h(x)\cos(\eta+\Delta\theta)\}$$

A phase difference $\Delta\phi$ which is found by subtracting $\phi_1$ from $\phi_2$ is expressed by the following equation.

$$\Delta\phi = 2k \sin(\Delta\theta/2)\{x \cos(\eta+\Delta\theta/2) - h(x)\sin(\eta+\Delta\theta/2)\}$$

An interval $\Delta h$ of contour lines on an axis perpendicular to the depth direction is expressed by the following equation.

$$\Delta h = \lambda/\{2 \sin(\Delta\theta/2)\sin(\eta+\Delta\theta/2)\}$$

$\Delta h$ indicates a range in which phase unwrapping can be optically carried out. In other words, the range depends on $\Delta\theta$ and $\eta$.

The control section 18 adjusts $\Delta\theta$ and $\eta$ so as to change the range in which phase unwrapping can be carried out, in accordance with the size of the subject 20 which size has been measured by the size measuring section 17. Specifically, for example, the control section 18 gives, to the angular difference adjusting section 19, an instruction to change an angle at which the polarization splitting element 11 is provided. In accordance with the instruction from the control section 18, the angular difference adjusting section 19 changes the angle at which the polarization splitting element 11 is provided, thereby changing values of $\Delta\theta$ and $\eta$.

Thus, the digital holography apparatus 63 measures an approximate size of the subject 20, and automatically adjusts (i) an angular difference $\Delta\theta$ between two types of object light beams which are different in polarization direction and (ii) an angle $\eta$ formed between an axis perpendicular to the image-capturing plane $2a$ and any one of the two types of object light beams. This makes it possible to carry out phase unwrapping by use of the two types of object light beams which have the angular difference $\Delta\theta$ and the angle $\eta$ which are suitable for the subject 20. This makes it possible to carry out phase unwrapping accurately in accordance with a subject so as to obtain three-dimensional information.

[Fifth Embodiment]

The following describes a digital holography apparatus of a fifth embodiment. The present embodiment relates to spectroscopic measurement digital holography utilizing three laser beams having respective wavelengths. For convenience of explanation, members and arrangements which have same functions as those in drawings described in the aforementioned embodiments are given common reference signs, and descriptions of such members and arrangements are not repeated below.

FIG. 17 is a schematic view illustrating an arrangement of a digital holography apparatus (interference measurement apparatus) 64 of the fifth embodiment. The digital holography apparatus 64 includes an in-line optical system. An optical axis of a reference light beam which is incident upon an image-capturing plane $2a$ is perpendicular to the image-capturing plane $2a$. A subject 24 is located optically right in front of the image-capturing plane $2a$. Accordingly, phase-shifting techniques are combined so that a zeroth-order diffraction image and a ±first-order diffraction image are separately obtained.

The digital holography apparatus 64 includes an optical system which includes three laser light sources 1a, 1b, and 1c, and an image-capturing apparatus which includes an image-capturing element 2 having an image-capturing plane $2a$ which image-capturing element 2 is a CCD. The digital holography apparatus 64 further includes a calculator 3 connected to an output of the image-capturing element 2. The image-capturing element 2 includes, on a front surface of the image-capturing plane $2a$, a wavelength-selecting filter 37 and a polarizer array device 34.

The laser light sources 1a, 1b, and 1c generate a first laser beam, a second laser beam, and a third laser beam which are different in wavelength, respectively. A wavelength of the first laser beam generated by the laser light source 1a is defined as $\lambda 1$. A wavelength of the second laser beam generated by the laser light source 1b is defined as $\lambda 2$. A wavelength of the third laser beam generated by the laser light source 1c is defined as $\lambda 3$. According to the present embodiment, $\lambda 1$ is 632.8 nm (red: R), $\lambda 2$ is 532 nm (green: G), and $\lambda 3$ is 441.6 nm (blue: B). Respective laser beams emitted from the laser light sources 1a, 1b, and 1c are combined by a mirror 13 and two beam-combining elements 14. Respective optical axes of the three laser beams thus combined coincide with each other.

A direction perpendicular to a propagation direction of the three laser beams is defined as a first direction, and a direction perpendicular to each of the propagation direction and the first direction is defined as a second direction. Each of the three laser beams is linearly-polarized light having a light component polarized in the first direction and a light component polarized in the second direction. Each of the three laser beams passes through a beam expander 4 and a collimator lens 5 so as to be collimated light. Then, each of the three laser beams is split by a beam splitter 6 into a reference light beam and an object light beam. Each of the reference light beam and the object light beam is made up of three laser beams having respective three wavelengths.

The digital holography apparatus 64 includes, between a mirror 8 and a beam-combining element 9, a phase-shifting array device 38 and an image-forming optical section 26, in order to split the reference light beam into a plurality of types of reference light beams having respective different phases.

(a) of FIG. 18 is a schematic view illustrating a part of the phase-shifting array device 38. The phase-shifting array device 38 has a plurality of regions which allow a laser beam to pass through so that the laser beam has different phases. The phase-shifting array device 38 is made up of 6 types of phase shifting regions 38a through 38f. Independently of its polarization direction, a portion of the reference light beam having a wavelength of λ1 which portion has passed through a phase-shifting region 38b has, on a plane perpendicular to a traveling direction of the reference light beam, a phase shifted by (−π/2) with respect to a phase of a portion of the reference light beam having a wavelength of λ1 which portion has passed through a phase-shifting region 38a. Independently of its polarization direction, similarly, a portion of the reference light beam having a wavelength of λ2 which portion has passed through a phase-shifting region 38d has, on a plane perpendicular to a traveling direction of the reference light beam, a phase shifted by (−π/2) with respect to a phase of a portion of the reference light beam having a wavelength of λ2 which portion has passed through a phase-shifting region 38c. Independently of its polarization direction, similarly, a portion of the reference light beam having a wavelength of λ3 which portion has passed through a phase-shifting region 38f has, on a plane perpendicular to a traveling direction of the reference light beam, a phase shifted by (−π/2) with respect to a phase of a portion of the reference light beam having a wavelength of λ3 which portion has passed through a phase-shifting region 38e. A phase shift of a portion of a reference light beam having a wavelength of λ2 or λ3 which portion has passed through the phase-shifting region 38a or 38b does not make any difference. This is because such a portion of the reference light beam is subsequently blocked by the wavelength-selecting filter 37 so that the portion of the reference light beam is not detected by the image-capturing element 2. For convenience of explanation, hereinafter, a portion of a reference light beam which portion has passed through the phase-shifting region 38a, 38c, or 38e is referred to as reference light beam having a phase shift amount of 0, and a portion of a reference light beam which portion has passed through the phase-shifting region 38b, 38d, or 38f is referred to as reference light beam having a phase shift amount of (−π/2).

In the phase-shifting array device 38, the 6 types of phase-shifting regions 38a through 38f are arranged as illustrated in (a) of FIG. 18. Further, a 4×4 cell structure illustrated in (a) of FIG. 18 is repeated in the phase-shifting array device 38. The phase-shifting array device 38 is made from, e.g., glass so that a thickness of the phase-shifting array device 38 is changed among the 6 types of the phase-shifting regions 38a through 38f.

The reference light beam which has passed through the phase-shifting array device 38 passes through the image-forming optical section 26. Then, the reference light beam is reflected by the beam-combining element 9. Then, the reference light beam passes through the wavelength-selecting filter 37 and the polarizer array device 34. Then, the reference light beam is incident upon the image-capturing plane 2a so that an optical axis of the reference light beam is substantially perpendicular to the image-capturing plane 2a. The reference light beam which has passed through the phase-shifting array device 38 is diffracted. Then, the reference light beam passes through the image-forming optical section 26 so as to form an image on the image-capturing plane 2a. The image-forming optical section 26 includes a plurality of lenses. For example, a portion of the reference light beam which portion has passed through one phase-shifting region 38a of the phase-shifting array device 38 forms an image on any one of pixels on the image-capturing plane 2a. That is, the portion of the reference light beam which portion has passed through one of cells, i.e., the phase-shifting regions 38a and 38f which are divided in a lattice pattern forms an image on any one of the pixels on the image-capturing plane 2a.

The object light beam which is the other one of the two split light beams is reflected by the mirror 10 so as to pass through the polarization splitting element 11. According to the present embodiment, the object light beam is split by the polarization splitting element 11 into two types of object light beams, i.e., a linearly-polarized object light beam which has only a light component polarized in the first direction and a linearly-polarized object light beam which has only a light component polarized in the second direction. The two types of object light beams are different in propagation direction by the angular difference of Δθ. Such two types of object light beams are incident upon the subject 24, with their angular difference kept. The object light beam reflected by the subject 24 passes through the beam-combining element 9, the wavelength-selecting filter 37, and the polarizer array device 34 so as to be incident upon the image-capturing plane 2a of the image-capturing element 2.

(b) of FIG. 18 is a schematic view illustrating a part of the wavelength-selecting filter 37 from the image-capturing plane 2a side. The wavelength-selecting filter 37 is a filter which selectively allows, in accordance with a wavelength, light to pass through. In the wavelength-selecting filter 37, (i) first wavelength-selecting regions 37a which allow light having a wavelength of λ1 to pass through but block light having a wavelength of λ2 or λ3, (ii) second wavelength-selecting regions 37b which allow light having a wavelength of λ2 to pass through but block light having a wavelength of λ1 or λ3, and (ii) third wavelength-selecting regions 37c which allow light having a wavelength of λ3 to pass through but block light having a wavelength of λ1 or λ2 are arranged.

(c) of FIG. 18 is a schematic view illustrating a part of the polarizer array device 34 from the image-capturing plane 2a side. The polarizer array device 34 is arranged such that polarizers (polarizer regions) 34a and 34b are arranged. The polarizers 34a extract, from light which passes through the polarizers 34a, only a light component polarized in a certain direction (in a horizontal direction in the present embodiment). On the other hand, the polarizers 34b extract, from light which passes through the polarizers 34b, only a light component polarized in a direction perpendicular to the certain direction above (in a vertical direction in the present embodiment). The reference light beam which is incident upon the polarizer array device 34 has a horizontally-polarized light component and a vertically-polarized light component. In the present embodiment, the first direction corresponds to the horizontal direction, and the second direction corresponds to the vertical direction. That is, the polarizers 34a allow only one of the two types of object light beams to pass through which one of the two types of object light beams has a polarization direction identical with that of the polarizers 34a (i.e., horizontal direction). Similarly, the polarizers 34b allow only the other of the two types of object light beams to pass through which other of the two types of object light beams has a polarization direction identical with that of the polarizers 34b (i.e., vertical direction). In addition, the polarizers 34a allow only a light component of the reference light beam to pass through which light component is polarized in a direction identical with that of the polarizers 34a (i.e., horizontal direction). Similarly, the polarizers 34b allow only a light component of the reference light beam to pass through which light component is polarized in a direction identical with that of the polarizers 34b (i.e., vertical direction).

The object light beam and the reference light beam which have passed through the polarizer array device 34 is incident upon the image-capturing plane 2a provided behind the polarizer array device 34. Light intensities according to interference between the object light beam and the reference light beam are measured by the pixels of the image-capturing plane 2a. Thus, the image-capturing element 2 captures an interference pattern (interference fringes) which has been formed on image-capturing plane 2a by the object light beam and the reference light beam. Since the polarizer array device 34, the wavelength-selecting filter 37, and the image-capturing plane 2a are directly attached to each other in this order, the wavelength-selecting regions 37a through 37c which are divided into a lattice pattern and the polarizers 34a and 34b which are divided into a lattice pattern correspond to the pixels on the image-capturing plane 2a, respectively. A portion of the reference light beam which portion has passed through one of the cells (phase-shifting regions 38a through 38f) of the phase-shifting array device 38 which cells are divided in a lattice pattern passes through the image-forming optical section 26 so as to form an image. Then, the portion of the reference light beam passes through one of the wavelength-selecting region 37a through 37c of the wavelength-selecting filter 37 31a and one of the polarizers 34a and 34b of the polarizer array device 34.

Accordingly, in total, the image-capturing plane 2a has pixels which capture twelve types of interference formed by a combination of (i) the two types of object light beams which are different in polarization direction and incident angle with respect to the subject 24 and (ii) the two types of reference light beams which are different in phase, with respect to each of the three wavelengths.

FIG. 19 is a view illustrating a part of an interference pattern 55 which can be obtained by the digital holography apparatus 64. The calculator 3 obtains, from the image-capturing element 2, image data indicative of the interference pattern (hologram) 55 captured by the image-capturing element 2.

The interference pattern 55 formed on the image-capturing plane 2a contains the following 12 types of pixels, (i) pixels 56a where the horizontally-polarized object light beam having a wavelength of $\lambda 1$ and a phase shift amount of 0 and the horizontally-polarized light component of the reference beam interfere with each other, (ii) pixels 56b where the horizontally-polarized object light beam having a wavelength of $\lambda 1$ and a phase shift amount of $(-\pi/2)$ and the horizontally-polarized light component of the reference beam interfere with each other, (iii) pixels 56c where the vertically-polarized object light beam having a wavelength of $\lambda 1$ and a phase shift amount of 0 and the vertically-polarized light component of the reference beam interfere with each other, (iv) pixels 56d where the vertically-polarized object light beam having a wavelength of $\lambda 1$ and a phase shift amount of $(-\pi/2)$ and the vertically-polarized light component of the reference beam interfere with each other, (v) pixels 56e where the horizontally-polarized object light beam having a wavelength of $\lambda 2$ and a phase shift amount of 0 and the horizontally-polarized light component of the reference beam interfere with each other, (vi) pixels 56f where the horizontally-polarized object light beam having a wavelength of $\lambda 2$ and a phase shift amount of $(-\pi/2)$ and the horizontally-polarized light component of the reference beam interfere with each other, (vii) pixels 56g where the vertically-polarized object light beam having a wavelength of $\lambda 2$ and a phase shift amount of 0 and the vertically-polarized light component of the reference beam interfere with each other, (viii) pixels 56h where the vertically-polarized object light beam having a wavelength of $\lambda 2$ and a phase shift amount of $(-\pi/2)$ and the vertically-polarized light component of the reference beam interfere with each other, (ix) pixels 56i where the horizontally-polarized object light beam having a wavelength of $\lambda 3$ and a phase shift amount of 0 and the horizontally-polarized light component of the reference beam interfere with each other, (x) pixels 56j where the horizontally-polarized object light beam having a wavelength of $\lambda 3$ and a phase shift amount of $(-\pi/2)$ and the horizontally-polarized light component of the reference beam interfere with each other, (xi) pixels 56k where the vertically-polarized object light beam having a wavelength of $\lambda 3$ and a phase shift amount of 0 and the vertically-polarized light component of the reference beam interfere with each other, and (xii) pixels 56l where the vertically-polarized object light beam having a wavelength of $\lambda 3$ and a phase shift amount of $(-\pi/2)$ and the vertically-polarized light component of the reference beam interfere with each other.

The calculator 3 extracts the 12 types of pixels 54a through 54l so as to obtain, with respect to the three types of wavelengths, interference patterns such as the interference pattern 46a through 46d illustrated in FIG. 6. With respect to each of the interference patterns corresponding to the three wavelengths, missing pixels are interpolated as is the case with the second embodiment, and the two-step phase-shifting technique is used. Thus, 6 types of complex amplitude distributions are obtained with respect to the three types of wavelengths and two types of polarization components. The reconstructed image is thus obtained. Further, phase unwrapping is carried out on the basis of the 6 types of complex amplitude distributions, with respect to each of the three types of wavelengths. The three-dimensional information of the subject 24 is thus obtained. With reference to a simulation result, the following describes an advantage of spectroscopic interference measurement utilizing laser beams having respective wavelengths.

<Simulation Result>

The inventors of the present invention conducted, by use of a calculator, simulation of phase unwrapping, in accordance with the present embodiment. The following describes a result of the simulation.

FIG. 17 illustrates an optical system which captures a subject. (a) of FIG. 20 is a view illustrating a height distribution of the subject 24 from the image-capturing element 2 side. In (a) of FIG. 20, a bright area and a dark area represent a height distribution of the subject 24 along its depth direction. The bright area (central part) is high in the depth direction, i.e., is closer to the image-capturing element 2. (b) of FIG. 20 is a view plotting the height distribution of the subject 24 along a section line D in (a) of FIG. 20. The subject 24 is an object having a convex shape. A bottom surface of the subject 24 has a size of 9 mm×9 mm and a maximal height of the subject 24 is 25 µm. (c) of FIG. 20 is a graph corresponding to (a) of FIG. 20 which graph illustrates an amplitude distribution which visually indicates bright areas and dark areas of the subject 24. The subject 24 has a pattern of "KIT." "K," "I," and "T" are drawn in red, green, and blue, respectively. A part of the subject 24 corresponding to "K" mainly reflects (scatters) light having a wavelength of $\lambda 1$, and has low reflectances with respect to lights having wavelengths of $\lambda 2$ and $\lambda 3$. Similarly, a part of the subject 24 corresponding to "I" has a high reflectance with respect to light having a wavelength of $\lambda 2$, and low reflectances with respect to lights having wavelengths of $\lambda 1$ and $\lambda 3$. A part of the subject 24 corresponding to "T" has a high reflectance with respect to light having a wavelength of $\lambda 3$, and low reflectances with respect to lights having wavelengths of $\lambda 1$ and $\lambda 2$. A region on the subject 24 other than the letters "KIT" is gray, and has substantially the same reflectance with respect to the lights having respective wavelengths of $\lambda 1$, $\lambda 2$, and $\lambda 3$.

The number of pixels of the image-capturing element 2 is 2048×2048. A pixel pitch is 5 µm. A distance between the image-capturing plane 2a of the image-capturing element 2 and the bottom surface of the subject 24 is 20 cm. Further, a ratio of an intensity of the object light beam incident upon the image-capturing plane 2a to an intensity of the reference light beam incident upon the image-capturing plane 2a was arranged to be 1:7 for both their horizontally-polarized light components and their vertically-polarized light components. Further, an incident angle of the horizontally-polarized object light beam with respect to the subject 24 was arranged to be 10°, and an incident angle of the vertically-polarized object light beam with respect to the subject 24 was arranged to be 14°. That is angles η and Δθ in FIG. 17 are 10° and 4°, respectively. The angles are those formed between a straight line perpendicular to the image-capturing plane 2a and each of the horizontally-polarized object light beam and the vertically-polarized object light beam which are incident upon the subject 24. Under the conditions, a theoretical range Δh in which phase unwrapping can be carried out is approximately 30.4 µm.

FIG. 21 is a view illustrating reconstructed images (amplitude distributions) of the subject 24 which reconstructed images were obtained by the calculator 3 with respect to each of the three wavelengths on the basis of the complex amplitude distributions obtained under the conditions above. In a reconstructed image obtained by use of the laser beam having a wavelength of λ1 (i.e., red), a red letter "K" in a region 80a enclosed in a box is bright. This indicates that optical information was obtained from a part corresponding to the letter "K." In contrast, a green letter "I" and a blue letter "T" in a region 80b which are enclosed in a box are dark. This indicates that optical information was not obtained from parts corresponding to the letters "I" and "T." This indicates that height information on the parts could not also be obtained. The same holds for the reconstructed images corresponding to the wavelengths of λ2 (green) and λ3 (blue). As for the reconstructed image corresponding to the wavelength of λ2, optical information on parts corresponding to the letters "K" and "T" in a region 80d enclosed in a box could not be obtained. As for the reconstructed image corresponding to the wavelength of λ3, optical information on parts corresponding to the letters "K" and "I" in a region 80f enclosed in a box could not be obtained.

FIG. 22 is a view showing height distributions of the subject 24 which were obtained by carrying out phase unwrapping with respect to each of the three wavelengths separately on the basis of the complex amplitude distributions. (a) through (c) of FIG. 22 are views showing, by bright areas and dark areas, height distributions of the subject 24 which were obtained with respect to each of the three wavelengths, which views correspond to (a) of FIG. 20. (d) through (f) of FIG. 22 correspond to (c) of FIG. 20. (d) through (f) of FIG. 22 are graphs showing height distributions of the subject 24 along section lines in (a) through (c) of FIG. 22, respectively.

(b) and (e) of FIG. 22 which are views for the wavelength of λ2 (green) show that in the parts corresponding to the letters "K" and "T" in regions 81d enclosed in boxes, there were large errors in the height distribution obtained by the phase unwrapping. Height distributions of the subject 24 which were taken along the section lines in the regions 81d in (b) of FIG. 22 correspond to parts enclosed in boxes 82d in (e) of FIG. 22. The same holds for the height distributions corresponding to the wavelengths of λ1 and λ3. In the height distribution obtained on the basis of the interference pattern corresponding to the wavelength of λ1, the parts corresponding to the letters "I" and "T" where no optical information is obtained have large errors in the height distribution obtained by the phase unwrapping. In the height distribution obtained on the basis of the interference pattern corresponding to the wavelength of λ3, the parts corresponding to the letters "K" and "I" where no optical information is obtained have large errors in the height distribution obtained by the phase unwrapping. Thus, a reflectance of the subject 24 has a large wavelength dependency. In this case, phase unwrapping by use of only light having a single wavelength does not make it possible to obtain accurate three-dimensional information of the subject 24.

In view of this, according to the present embodiment, a most reliable height distribution is extracted, with respect to each region of a reconstructed image, from the height distributions obtained by use of laser beams having respective three wavelengths so that a height distribution of the subject 24 which height distribution has a smaller error can be obtained.

That is, a height distribution (a part in the box 82a in (d) of FIG. 22) obtained by use of a laser beam having a wavelength of λ1 corresponding to red is used as a height distribution in the region 81a in FIG. 21 which height distribution corresponds to the red letter "K." Similarly, a height distribution (a part in the box 82c in (e) of FIG. 22) obtained by use of a laser beam having a wavelength of λ2 corresponding to green is used as a height distribution in the region 81c in FIG. 21 which height distribution corresponds to the green letter "I." Similarly, a height distribution (a part in the box 82e in (f) of FIG. 22) obtained by use of a laser beam having a wavelength of λ3 corresponding to blue is used as a height distribution in the region 81e in FIG. 21 which height distribution corresponds to the blue letter "T."

Specifically, intensities of reconstructed light are compared with each other, among the reconstructed images corresponding to the three wavelengths, with respect to each of predetermined regions of a reconstructed image. Thus, a height distribution corresponding to a wavelength at which the reconstructed light has a largest intensity is extracted as a height distribution of the region. It is possible to use an average, a median, or the like of pixel values (amplitude values of light) of pixels contained in a predetermined region, as an intensity of reconstructed light which intensity represents intensities of the predetermined region. Alternatively, it is possible to compare intensities of reconstructed light, among the reconstructed images corresponding to the three wavelengths, with respect to a predetermined region of the reconstructed images in which predetermined region a target pixel is contained, so that a height distribution corresponding to a wavelength at which the reconstructed light has a largest intensity is extracted as a height distribution of the target pixel.

According to the present embodiment, intensities of reconstructed light are compared with each other, pixel by pixel, among reconstructed images corresponding to the three wavelengths. Then, a height distribution corresponding to a wavelength at which the reconstructed light has a largest intensity among the reconstructed images is adopted (selected) as a height distribution of a target pixel. Such a maximal amplitude value insertion process is carried out with respect to each of the pixels. This makes it possible to obtain an accurate height distribution of the subject 24.

In the present embodiment, the intensities of the reconstructed light were compared with each other pixel by pixel, as described above. Alternatively, such comparison can be carried out with respect to each of small regions each of which contains a plurality of pixels. This makes it possible to carry out the maximal amplitude value insertion process, without being affected by a noise and a speckle of the reconstructed light.

(a) of FIG. 23 is a view showing, by a bright area and a dark area, a height distribution of the subject 24 which was obtained by carrying out the maximal amplitude value insertion process, which view corresponds to (a) of FIG. 20. (d) of FIG. 23 correspond to (c) of FIG. 20. (d) of FIG. 23 is a graph showing a height distribution of the subject 24 along a section line in (a) of FIG. 23.

As a result of the maximal amplitude value insertion process, a part of a height distribution found for one of the three wavelengths in which part a large error was caused is replaced with a height distribution corresponding to a different wavelength which height distribution is an accurate result of phase unwrapping, with respect to each of the three wavelengths. As a whole, it is possible to obtain a height distribution which accurately reconstructs the height distribution of the subject 24.

As a comparative example, a height distribution of the subject 24 was found by carrying out phase unwrapping by use of a conventional multiple wavelengths phase unwrapping technique under the same conditions. (a) of FIG. 24 is a view illustrating, by bright areas and dark areas, a height distribution of the subject 24 which was obtained by the conventional multiple wavelengths phase unwrapping technique, which view corresponds to (a) of FIG. 23. (b) of FIG. 24 is a graph showing a height distribution of the subject 24 along a section line in (a) of FIG. 24, which graph corresponds to (b) of FIG. 23.

(a) and (b) of FIG. 24 shows that phase unwrapping failed in areas where the letters "K," "I," and "T" are located, and accordingly, the three-dimensional shape of the subject 24 was not properly reconstructed. This is because the reflectance of the subject 24 has a large wavelength dependency in the areas corresponding to the letters "K," "I," and "T."

FIG. 25 is a block diagram illustrating an arrangement of the calculator 3. The calculator 3 includes a reproduction processing section 71, a phase unwrapping processing section 72, and an extraction processing section 73.

The reproduction processing section 71 obtains image data indicative of an interference pattern from the image-capturing element (not illustrated). On the basis of the image data indicative of the interference pattern, the reproduction processing section 71 carries out type-by-type extraction of pixels, an interpolation process, diffraction integral, etc. so as to obtain, with respect to each wavelength, a reconstructed image of a subject.

On the basis of the image data indicative of the interference pattern, the phase unwrapping processing section 72 carries out phase unwrapping so as to obtain, with respect to each wavelength, a height distribution of the subject.

With respect to a predetermined region containing a target pixel in the reconstructed image, the extraction processing section 73 determines a value which represents intensities of reconstructed light in the region, with respect to each of the wavelengths. With respect to the predetermined region, the extraction processing section 73 compares the representative values for the wavelengths so as to extract a height distribution corresponding to a wavelength at which the representative value is largest, as a height distribution of the target pixel. According to the present embodiment, the predetermined region corresponds to the target pixel. The extraction processing section 73 carries out the extraction process with respect to some or all the pixels of the reconstructed image, and combines extracted height distributions, thereby obtaining the height distribution of the subject.

According to the present embodiment, phase unwrapping is carried out by use of two complex amplitude distributions which are obtained by use of a laser beam having a single wavelength and between which an incident angle of the object light beam is different, thereby obtaining a height distribution of the subject. Then, highly reliable parts of height distributions found for different wavelengths are extracted. This makes it possible to obtain accurate three-dimensional information of a subject whose reflectance has a large wavelength dependency.

According to the present embodiment, further, the use of the laser beams of the three colors, red, green, and blue makes it possible to obtain a color reconstructed image which reconstruct colors of the subject. A type of a laser beam to be used is not limited to this. It is also possible to adopt light other than visible light such as infrared rays, ultraviolet rays, and X-rays. The number of laser beams to be used is not limited to three but may be four or more.

[Modifications]

An interference measurement apparatus of the present invention includes: at least one light source which generates coherent light; a light splitting section which splits, into a reference light beam and an object light beam, the coherent light emitted from the at least one light source; an image-capturing section which captures an interference image formed by the reference light beam and the object light beam which has reached the image-capturing section via a subject; a polarization splitting section which splits, into two types of object light beams which are different in polarization direction, the object light beam emitted from the light splitting section, so that an angular difference is caused between respective propagation directions of the two types of object light beams; and a polarizer array section which allows (i) the reference light beam and (ii) the two types of object light beams which have reached the polarizer array section via the subject to pass through the polarizer array section, the polarizer array section in which a plurality of first polarizer regions and a plurality of second polarizer regions are arranged, and each of the plurality of first polarizer regions and each of the plurality of second polarizer regions respectively allowing light components which are different in polarization direction to pass through.

According to the arrangement, the object light beam can be split, by the polarization splitting section, into two types of object light beams which are different in polarization direction and whose propagation directions have an angular difference therebetween. Further, the polarizer array section allows the image-capturing section to separately capture the reference light beam and the object light beam according to a polarization direction.

This makes it possible t obtain, by one-time image capturing, interference images containing two types of interference information obtained by use of the two types of object light beams which have the angular difference therebetween. This makes it possible to carry out phase unwrapping on the basis of the interference images.

Therefore, even if a subject is, e.g., one which dynamically changes, it is possible to obtain the three-dimensional information of the subject of a certain moment by one-time image capturing.

Further, the interference measurement apparatus may be arranged such that: respective polarization directions of the two types of object light beams are a first direction and a second direction; a direction in which the plurality of first polarizer regions allow a light component to pass through the plurality of first polarizer regions matches the first direction; and a direction in which the plurality of second polarizer regions allow a light component to pass through the plurality of second polarizer regions matches the second direction.

The interference measurement apparatus may be arranged such that the first direction and the second direction are perpendicular to each other.

The arrangement makes it possible to capture the two types of object light beams which are different in polarization direction, completely separately with respect to each the polarization direction. This makes it possible to improve accuracy of phase unwrapping.

Further, the interference measurement apparatus may further include a phase-shifting array section which allows the reference light beam to pass through the phase-shifting array section, the phase-shifting array section in which a plurality of first phase-shifting regions and a plurality of second phase-shifting regions are arranged, the phase-shifting array section causing a difference in phase between a portion of the reference light beam which portion has passed through the plurality of first phase-shifting regions and a portion of the reference light beam which portion has passed through the plurality of second phase-shifting regions.

According to the arrangement, it is possible to further obtain interference images containing a plurality of pieces of interference information obtained by use of reference light beams which are different in phase. This makes it possible to separately obtain a zeroth-order diffraction image and a ±first-order diffraction image of a reconstructed image on the basis of the interference images by the phase-shifting technique. This makes it possible to obtain a clear reconstructed image of a subject.

Further, the interference measurement apparatus may further include, between the subject and the image-capturing section, an optical path length-shifting array section which allows the reference light beam and the two types of object light beams to pass through the optical path length-shifting array section, the optical path length-shifting array section in which a plurality of first optical path length-shifting regions and a plurality of second optical path length-shifting regions are arranged, the optical path length-shifting array section causing a difference in phase between a portion of the reference light beam which portion has passed through the plurality of first optical path length-shifting regions and a portion of the reference light beam which portion has passed through the plurality of second optical path length-shifting regions, and the optical path length-shifting array section causing a difference in phase between (i) respective portions of the two types of object light beams which portions have passed through the plurality of first optical path length-shifting regions and (ii) respective portions of the two types of object light beams which portions have passed through the plurality of second optical path length-shifting regions.

The arrangement makes it possible to further obtain interference images containing a plurality of pieces of interference information between which an optical path length between the subject and the image-capturing section is varied. This makes it possible to separately obtain a zeroth-order diffraction image and a ±first-order diffraction image of a reconstructed image on the basis of the interference images by the optical path length-shifting technique. This makes it possible to obtain a clear reconstructed image of a subject.

Further, the interference measurement apparatus may further include a wavelength-selecting filter, the at least one light source being a plurality of light sources, the plurality of light sources respectively generating coherent lights which are different in wavelength, the wavelength-selecting filter having a plurality of wavelength-selecting regions which are different in wavelength at which light is passed through the plurality of wavelength-selecting regions, the wavelength-selecting filter selectively allowing the reference beam light and the two types of object light beams to pass through the wavelength-selecting filter, in accordance with respective wavelengths of the plurality of wavelength-selecting regions.

The arrangement makes it possible to use a plurality of laser beams which are different in wavelength so as to obtain a reconstructed image and three-dimensional information of a subject by one-time image capturing with respect to each wavelength.

This makes it possible to carry out phase unwrapping even if the subject has a wavelength dependency. In addition, this makes it possible to obtain three-dimensional correlation of parts of the subject even if the parts are different in reflectance or transmittance with respect to each wavelength.

Further, the interference measurement apparatus may further include: a size measuring section; a control section; and an angular difference adjusting section, the size measuring section measuring a size of the subject along a depth direction as viewed from the image-capturing section, the control section (i) determining, on the basis of the size thus measured by the size measuring section, a range in which phase unwrapping can be carried out, and (ii) giving an instruction to the angular difference adjusting section in accordance with the range thus determined, and the angular difference adjusting section altering, on the basis of the instruction from the control section, the angular difference between the two types of object light beams split by the polarization splitting section.

According to the arrangement, the size measuring section measures a size along the depth direction, the control section gives the angular difference adjusting section an instruction, and the angular difference adjusting section alters the angular difference between the two types of object light beams in accordance with the instruction. This makes it possible to secure an range for phase unwrapping which range is appropriate for subjects which can have various sizes along the depth direction so as to perform measurement.

Further, the interference measurement apparatus may further include a reproducer section which finds a reconstructed image and a height distribution of the subject on the basis of the interference image captured by the image-capturing section.

The arrangement makes it possible to obtain a reconstructed image of a subject on the basis of interference images captured by the image-capturing section.

Further, the reproducer section may include: a reproduction processing section which finds, with respect to each of a plurality of wavelengths, a reconstructed image of the subject on the basis of the interference image; a phase unwrapping processing section which carries out, on the basis of the interference image, phase unwrapping with respect to each of the plurality of wavelengths so as to find a height distribution of the subject; and an extraction processing section which compares representative intensities of wavelengths of reproduced light in a predetermined region which covers a target pixel in pixels which form the reconstructed image, so as to extract, as a height distribution of the target pixel, a height distribution of a wavelength at which the reproduced light has a highest intensity.

The arrangement makes it is possible to extract, pixel by pixel, a height distribution corresponding to a wavelength at which reconstructed light has a large intensity and three-dimensional information is highly reliable, from a plurality of height distributions obtained for different light wavelengths. By combining height distributions extracted by the extraction process, it is possible to obtain a highly reliable height distribution of a subject which height distribution is small in error of phase unwrapping.

This makes it possible to obtain accurate three-dimensional information of a subject whose reflectance has a large wavelength dependency.

An interference measurement method of the present invention includes the steps of: splitting coherent light into a reference light beam and an object light beam; splitting the object light beam into two types of object light beams which are different in polarization direction, so that an angular difference is caused between respective propagation directions of the two types of object light beams; passing, through a polarizer array section in which a plurality of first polarizer regions and a plurality of second polarizer regions are arranged, the reference light beam and the two types of object light beams which have reached the polarizer array section via a subject, so that light components which are different in polarization direction pass through the plurality of first polarizer regions and the plurality of second polarizer regions; and capturing an interference image formed by the reference light beam and the two types of object light beams which reference light beam and two types of object light beams have passed thorough the polarizer array section.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention is applicable to a biomicroscope, an industrial microscope, a motion analysis apparatus, a product inspection apparatus, a shape measurement apparatus, a particle/fluid measurement apparatus, etc.

REFERENCE SIGNS LIST 1, 1a, 1b, 1c Laser light source (light source)
2 Image-capturing element (image-capturing section)
2a Image-capturing plane
3 Calculator (reproducer section)
4 Beam expander
5 Collimator lens
6 Beam splitter (light splitting section)
7, 8, 10, 13, 16 Mirror
9, 14 Beam-combining element
11, 15 Polarization splitting element (polarization splitting section)
12 Image-forming optical element
17 Size measuring section
18 Control section
19 Angular difference adjusting section
20 Subject
21, 22, 23, 24 Subject
23a, 23b Substance
26 Image-forming optical section
30, 31, 32, 34 Polarizer array device (polarizer array section)
30a, 30b, 31a, 31b, 32a, 32b, 34a, 34b Polarizer (polarizer region)
33, 37 Wavelength-selecting filter
33a, 33b, 37a through 37c Wavelength-selecting region
35, 38 Phase-shifting array device (phase-shifting array section)
35a, 35b, 38a through 38f Phase-shifting region
36 Optical path length-shifting array device (optical path length-shifting array section)
36a, 36b Optical path length-shifting region
40, 44, 53, 55 Interference pattern (interference image)
41a, 41b, 45a through 45d, 49a, 49b, 54a through 54h, 56a through 56l Pixel
42a, 42b, 43a, 43b, 46a through 46d Interference pattern
47a, 47b Interference pattern
48, 50a, 50b, 51a, 51b Intensity distribution of reference light beam
52a, 52b Complex amplitude distribution
60, 61, 62, 63, 64 Digital holography apparatus (interference measurement apparatus)
71 Reproduction processing section
72 Phase unwrapping processing section
73 Extraction processing section
80a through 80f, 81a through 81f, 82a through 82f Region

The invention claimed is:

1. An interference measurement apparatus comprising:
at least one light source which generates coherent light;
a light splitting section which splits, into a reference light beam and an object light beam, the coherent light emitted from the at least one light source;
an image-capturing section which captures an interference image formed by the reference light beam and the object light beam which has reached the image-capturing section via a subject;
a polarization splitting section which splits, into two types of object light beams, a first object light beam polarized in a first direction and a second object light beam polarized in a second direction which is different from the first direction, the object light beam emitted from the light splitting section, so that an angular difference is caused between respective propagation directions of the two types of object light beams; and
a polarizer array section which allows (i) the reference light beam and (ii) the two types of object light beams which have reached the polarizer array section via the subject to pass through the polarizer array section, the polarizer array section in which a plurality of first polarizer regions and a plurality of second polarizer regions are arranged, the plurality of first polarizer regions having their transmission axes in the first direction and the plurality of second polarizer regions having their transmission axes in the second direction,
wherein the image-capturing section which captured the interference image contains (I) a first interference pattern of interference between the first object light beam and a light component of the reference light beam which light component is polarized in the first direction and (II) a second interference pattern of interference between the second object light beam and a light component of the reference light beam which light component is polarized in the second direction,
wherein the reference light beam passes through a path to go around the polarization splitting section and the subject.

2. An interference measurement apparatus as set forth in claim 1, further comprising a phase-shifting array section which allows the reference light beam to pass through the phase-shifting array section, the phase-shifting array section in which a plurality of first phase-shifting regions and a plurality of second phase-shifting regions are arranged,
the phase-shifting array section causing a difference in phase between a portion of the reference light beam which portion has passed through the plurality of first phase-shifting regions and a portion of the reference light beam which portion has passed through the plurality of second phase-shifting regions.

3. An interference measurement apparatus as set forth in claim 1, further comprising, between the subject and the image-capturing section, an optical path length-shifting array section which allows the reference light beam and the two types of object light beams to pass through the optical path length-shifting array section, the optical path length-shifting array section in which a plurality of first optical path length-shifting regions and a plurality of second optical path length-shifting regions are arranged, the optical path length-shifting array section causing a difference in phase between a portion of the reference light beam which portion has passed through the plurality of first optical path length-shifting regions and a portion of the reference light beam which portion has passed through the plurality of second optical path length-shifting regions, and the optical path length-shifting array section causing a difference in phase between (i) respective portions of the two types of object light beams which portions have passed through the plurality of first optical path length-shifting regions and (ii) respective portions of the two types of object light beams which portions have passed through the plurality of second optical path length-shifting regions.

4. An interference measurement apparatus as set forth in claim 1, further comprising a wavelength-selecting filter, the at least one light source being a plurality of light sources, the plurality of light sources respectively generating coherent lights which are different in wavelength, the wavelength-selecting filter having a plurality of wavelength-selecting regions which are different in wavelength at which light is passed through the plurality of wavelength-selecting regions, the wavelength-selecting filter selectively allowing the reference beam light and the two types of object light beams to pass through the wavelength-selecting filter, in accordance with respective wavelengths of the plurality of wavelength-selecting regions.

5. An interference measurement apparatus as set forth in claim 4, further comprising a reproducer section which extracts, from the interference image, pixels corresponding to the first interference pattern and pixels corresponding to the second interference pattern so as to generate a reconstructed image of the subject, the reproducer section including:

a reproduction processing section which finds, with respect to each of a plurality of wavelengths, a reconstructed image of the subject on the basis of the interference image;

a phase unwrapping processing section which carries out, on the basis of the interference image, phase unwrapping with respect to each of the plurality of wavelengths so as to find a height distribution of the subject; and an extraction processing section which compares representative intensities of wavelengths of reproduced light in a predetermined region which covers a target pixel in pixels which form the reconstructed image, so as to extract, as a height distribution of the target pixel, a height distribution of a wavelength at which the reproduced light has a highest intensity.

6. An interference measurement apparatus as set forth in claim 1, further comprising a reproducer section which extracts, from the interference image, pixels corresponding to the first interference pattern and pixels corresponding to the second interference pattern so as to generate a reconstructed image of the subject, the reproducer section finding a height distribution of the subject.

7. An interference measurement apparatus as set forth in claim 1, further comprising:

a size measuring device configured to measure a size of the subject along a depth direction as viewed from the image-capturing section;

an angular difference adjusting device configured to alter on the basis of the instruction from the control section, the angular difference between the two types of object light beams split by the polarization splitting section; and a control device, wherein the control device (i) determining, on the basis of the size thus measured by the size measuring device, a range in which phase unwrapping can be carried out, and (ii) giving an instruction to the angular difference adjusting device in accordance with the range thus determined.

8. An interference measurement method comprising:

splitting coherent light into a reference light beam and an object light beam;

splitting the object light beam into two types of object light beams, a first object light beam polarized in a first direction and a second object light beam polarized in a second direction which is different from the first direction so that an angular difference is caused between respective propagation directions of the two types of object light beams;

passing, through a plurality of first polarizer regions having their transmission axes in the first direction and a plurality of second polarizer regions having their transmission axes in the second direction, the reference light beam and the two types of object light beams which have reached the polarizer array section via a subject to pass through, so that light components which are different in polarization direction pass through the plurality of first polarizer regions and the plurality of second polarizer regions; and capturing an interference image containing (I) a first interference pattern of interference between the first object light beam and a light component of the reference light beam which light component is polarized in the first direction and (II) a second interference pattern of interference between the second object light beam and a light component of the reference light beam which light component is polarized in the second direction, wherein the reference light beam passes through a path to go around the polarization splitting section and the subject.

\* \* \* \* \*